US011615337B1

(12) United States Patent
Naveh et al.

(10) Patent No.: US 11,615,337 B1
(45) Date of Patent: Mar. 28, 2023

(54) DETERMINING QUANTUM ERROR CORRECTION SCHEMES

(71) Applicant: Classiq Technologies LTD., Tel Aviv (IL)

(72) Inventors: Amir Naveh, Haifa (IL); Shmuel Ur, Shorashim (IL); Eyal Cornfeld, Ramat Gan (IL); Ofek Kirzner, Haifa (IL); Yehuda Naveh, Tel-Aviv Yafo (IL); Lior Gazit, Tel-Aviv (IL)

(73) Assignee: CLASSIQ TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 17/722,703

(22) Filed: Apr. 18, 2022

(51) Int. Cl.
*G06N 10/70* (2022.01)
*G06N 10/40* (2022.01)
*G06N 10/20* (2022.01)

(52) U.S. Cl.
CPC ............. *G06N 10/70* (2022.01); *G06N 10/20* (2022.01); *G06N 10/40* (2022.01)

(58) Field of Classification Search
CPC ......... G06N 10/70; G06N 10/20; G06N 10/40
See application file for complete search history.

(56) References Cited

U.S. PATENT DOCUMENTS

| | | | | |
|---|---|---|---|---|
| 2017/0177751 A1* | 6/2017 | Macready | ............... | G06F 17/11 |
| 2019/0302979 A1* | 10/2019 | Klein | .................. | G06F 3/04845 |
| 2020/0125985 A1* | 4/2020 | Narang | ................... | G06N 3/126 |
| 2020/0218842 A1* | 7/2020 | Itoko | ..................... | G06F 30/327 |
| 2021/0173988 A1* | 6/2021 | Cao | ......................... | G06N 10/00 |
| 2022/0156630 A1* | 5/2022 | Schuster | ............... | G06N 10/00 |
| 2022/0164253 A1* | 5/2022 | On | ...................... | G06F 11/1044 |

OTHER PUBLICATIONS

Taibi et al., Hill-Climbing, Simulated Annealing and Genetic Algorithms: A Comparative Study and Application to the Mapping Problem, 1993, 9 pages (Year: 1993).*

* cited by examiner

*Primary Examiner* — Brian M Smith
*Assistant Examiner* — Tri T Nguyen
(74) *Attorney, Agent, or Firm* — Tutunjian & Bitetto, P.C.

(57) ABSTRACT

A method, apparatus and product includes obtaining a logical representation of a quantum circuit that is implementable by a plurality of alternative physical representations of the quantum circuit, each of which implementing the logical representation with a different error correction scheme and defining error correction schemes for the quantum circuit. The defining error correction schemes includes implementing a search algorithm on the alternative physical representations, wherein the search algorithm is configured to search for a physical representation of the quantum circuit with an assignment of a plurality of physical qubits to a plurality of logical qubits that is defined in view of a quality score. A quality metric used to compute the quality score is monotonically correlated to error rates of logical output qubits of the quantum circuit when implementing each alternative physical representation. The assignment is utilized to define the error correction schemes for the quantum circuit.

18 Claims, 6 Drawing Sheets

OBTAIN A LOGICAL REPRESENTATION OF A CIRCUIT — 110

DEFINE ERROR CORRECTION SCHEMES FOR THE CIRCUIT — 120

SYNTHESIZE THE CIRCUIT — 130

DETERMINING QUANTUM ERROR CORRECTION SCHEMES

TECHNICAL FIELD

The present disclosure relates to quantum computing in general, and to error correcting in quantum computing, in particular.

BACKGROUND

Quantum computing is a computational paradigm that is fundamentally different from classic computing. In contrast to classic computing, which utilizes bits, quantum computing utilizes qubits. The qubits have unique features, as each qubit can be in superposition, several qubits can be entangled, and all operations on qubits besides measurement, referred to as quantum gates, must be reversible. Temporarily computed values are stored on additional helper qubits, referred to as auxiliary qubits.

Quantum Error Correction (QEC) may be configured to protect quantum information from errors due to decoherence and other quantum noise. Quantum error correction is essential if one is to achieve fault-tolerant quantum computation that can handle noise on stored quantum information.

BRIEF SUMMARY

One exemplary embodiment of the disclosed subject matter is a method comprising: obtaining a logical representation of a quantum circuit, wherein the logical representation comprises a plurality of logical qubits, wherein the logical representation defines gate operations on subsets of the plurality of logical qubits in a plurality of cycles, wherein the plurality of logical qubits comprises one or more logical output qubits, wherein the logical representation of the quantum circuit is configured to provide an output via the one or more logical output qubits, wherein the logical representation of the quantum circuit is implementable by a plurality of alternative physical representations of the quantum circuit, each of which implementing the logical representation with a different error correction scheme, wherein each alternative physical representation of the plurality of alternative physical representations comprises a plurality of physical qubits, wherein a number of the plurality of physical qubits is greater than a number of the plurality of logical qubits; defining error correction schemes for the quantum circuit, wherein an error correction scheme of the error correction schemes is configured to implement error correction operations to a group of one or more logical qubits using multiple physical qubits, wherein a number of the multiple physical qubits is greater than a number of the group of the one or more logical qubits, wherein said defining the error correction schemes comprises: implementing a search algorithm on the plurality of alternative physical representations of the quantum circuit, wherein the search algorithm is configured to search the plurality of alternative physical representations for a physical representation of the quantum circuit with an assignment of the plurality of physical qubits to the plurality of logical qubits, wherein the assignment is defined in view of a quality score of each alternative physical representation, wherein a quality metric used to compute the quality score is monotonically correlated to error rates of the one or more logical output qubits of the quantum circuit when implementing each alternative physical representation; and utilizing the assignment of the plurality of physical qubits to the plurality of logical qubits to define the error correction schemes for the quantum circuit; and synthesizing the quantum circuit using the error correction schemes, whereby a synthesized quantum circuit utilizes the multiple physical qubits that are assigned to the groups of the one or more logical qubits to represent the group of the one or more logical qubits in a manner reducing an error rate of the plurality of logical qubits.

Optionally, the method comprises obtaining a quality measurer, wherein the quality measurer is configured to compute quality scores of quantum circuits with defined error correction schemes, wherein said implementing the search algorithm comprises applying the quality measurer.

Optionally, obtaining the quality measurer comprises generating the quality measurer.

Optionally, generating the quality measurer comprises: obtaining a set of assignments of physical qubits to logical qubits and computed quality scores relating thereto; and generating the quality measurer based on interpolation of the set of assignments and computed quality scores relating thereto.

Optionally, the quality score is determined based on a ratio between: a number of executions of a theoretical representation of the quantum circuit that are needed to obtain a predetermined number of correct outputs, and a number of executions of the quantum circuit that implements the error correction schemes on a quantum computer, which are needed to obtain the predetermined number of the correct outputs.

Optionally, the quality score is determined based on a distance metric between: a distribution provided by a theoretical representation of the quantum circuit, and a distribution provided by executing, on a quantum computer, the quantum circuit that implements the error correction schemes.

Optionally, the assignment is an assignment in which at least two logical qubits of the plurality of logical qubits have different error rates.

Optionally, defining the error correction schemes for the quantum circuit comprises: defining for a first logical qubit of the plurality of logical qubits a first error correction scheme that utilizes a first set of physical qubits of the plurality of physical qubits, wherein a number of physical qubits in the first set of physical qubits is greater than one; and defining for a second set of logical qubits of the plurality of logical qubits a second error correction scheme that utilizes a second set of physical qubits of the plurality of physical qubits, wherein a number of qubits in the second set of physical qubits is greater than a number of qubits in the second set of logical qubits, wherein the first set of physical qubits and the second set of physical qubits are disjoint sets, wherein the first logical qubit and the second set of logical qubits are disjoint.

Optionally, the error correction schemes utilize a surface code technique for representing the group of one or more logical qubits using the multiple physical qubits.

Optionally, the search algorithm comprises a gradient descent algorithm, a hill climbing algorithm, or the like.

Optionally, the search algorithm comprises a local search optimizer, a global search optimizer, or the like.

Another exemplary embodiment of the disclosed subject matter is an apparatus comprising a processor and coupled memory, said processor being adapted to: obtain a logical representation of a quantum circuit, wherein the logical representation comprises a plurality of logical qubits, wherein the logical representation defines gate operations on subsets of the plurality of logical qubits in a plurality of cycles, wherein the plurality of logical qubits comprises one or more logical output qubits, wherein the logical representation of the quantum circuit is configured to provide an output via the one or more logical output qubits, wherein the logical representation of the quantum circuit is implementable by a plurality of alternative physical representations of the quantum circuit, each of which implementing the logical representation with a different error correction scheme, wherein each alternative physical representation of the plurality of alternative physical representations comprises a plurality of physical qubits, wherein a number of the plurality of physical qubits is greater than a number of the plurality of logical qubits; define error correction schemes for the quantum circuit, wherein an error correction scheme of the error correction schemes is configured to implement error correction operations to a group of one or more logical qubits using multiple physical qubits, wherein a number of the multiple physical qubits is greater than a number of the group of the one or more logical qubits, wherein said defining the error correction schemes comprises: implementing a search algorithm on the plurality of alternative physical representations of the quantum circuit, wherein the search algorithm is configured to search the plurality of alternative physical representations for a physical representation of the quantum circuit with an assignment of the plurality of physical qubits to the plurality of logical qubits, wherein the assignment is defined in view of a quality score of each alternative physical representation, wherein a quality metric used to compute the quality score is monotonically correlated to error rates of the one or more logical output qubits of the quantum circuit when implementing each alternative physical representation; and utilizing the assignment of the plurality of physical qubits to the plurality of logical qubits to define the error correction schemes for the quantum circuit; and synthesize the quantum circuit using the error correction schemes, whereby a synthesized quantum circuit utilizes the multiple physical qubits that are assigned to the groups of the one or more of logical qubits to represent the group of the one or more logical qubits in a manner reducing an error rate of the plurality of logical qubits.

Yet another exemplary embodiment of the disclosed subject matter is a system comprising a processor and coupled memory, said processor being adapted to: obtain a logical representation of a quantum circuit, wherein the logical representation comprises a plurality of logical qubits, wherein the logical representation defines gate operations on subsets of the plurality of logical qubits in a plurality of cycles, wherein the plurality of logical qubits comprises one or more logical output qubits, wherein the logical representation of the quantum circuit is configured to provide an output via the one or more logical output qubits, wherein the logical representation of the quantum circuit is implementable by a plurality of alternative physical representations of the quantum circuit, each of which implementing the logical representation with a different error correction scheme, wherein each alternative physical representation of the plurality of alternative physical representations comprises a plurality of physical qubits, wherein a number of the plurality of physical qubits is greater than a number of the plurality of logical qubits; define error correction schemes for the quantum circuit, wherein an error correction scheme of the error correction schemes is configured to implement error correction operations to a group of one or more logical qubits using multiple physical qubits, wherein a number of the multiple physical qubits is greater than a number of the group of the one or more logical qubits, wherein said defining the error correction schemes comprises: implementing a search algorithm on the plurality of alternative physical representations of the quantum circuit, wherein the search algorithm is configured to search the plurality of alternative physical representations for a physical representation of the quantum circuit with an assignment of the plurality of physical qubits to the plurality of logical qubits, wherein the assignment is defined in view of a quality score of each alternative physical representation, wherein a quality metric used to compute the quality score is monotonically correlated to error rates of the one or more logical output qubits of the quantum circuit when implementing each alternative physical representation; and utilizing the assignment of the plurality of physical qubits to the plurality of logical qubits to define the error correction schemes for the quantum circuit; and synthesize the quantum circuit using the error correction schemes, whereby a synthesized quantum circuit utilizes the multiple physical qubits that are assigned to the groups of the one or more of logical qubits to represent the group of the one or more logical qubits in a manner reducing an error rate of the plurality of logical qubits.

Yet another exemplary embodiment of the disclosed subject matter is a computer program product comprising a non-transitory computer readable medium retaining program instructions, which program instructions, when read by a processor, cause the processor to: obtain a logical representation of a quantum circuit, wherein the logical representation comprises a plurality of logical qubits, wherein the logical representation defines gate operations on subsets of the plurality of logical qubits in a plurality of cycles, wherein the plurality of logical qubits comprises one or more logical output qubits, wherein the logical representation of the quantum circuit is configured to provide an output via the one or more logical output qubits, wherein the logical representation of the quantum circuit is implementable by a plurality of alternative physical representations of the quantum circuit, each of which implementing the logical representation with a different error correction scheme, wherein each alternative physical representation of the plurality of alternative physical representations comprises a plurality of physical qubits, wherein a number of the plurality of physical qubits is greater than a number of the plurality of logical qubits; define error correction schemes for the quantum circuit, wherein an error correction scheme of the error correction schemes is configured to implement error correction operations to a group of one or more logical qubits using multiple physical qubits, wherein a number of the multiple physical qubits is greater than a number of the group of the one or more logical qubits, wherein said defining the error correction schemes comprises: implementing a search algorithm on the plurality of alternative physical representations of the quantum circuit, wherein the search algorithm is configured to search the plurality of alternative physical representations for a physical representation of the quantum circuit with an assignment of the plurality of physical qubits to the plurality of logical qubits, wherein the assignment is defined in view of a quality score of each alternative physical representation, wherein a quality metric used to compute the quality score is monotonically correlated to error rates of the one or more logical output qubits of the quantum circuit when implementing each alternative physical representation; and utilizing the assignment of the plurality of physical qubits to the plurality of logical qubits to define the error correction schemes for the quantum circuit; and synthesize the quantum circuit using the error correction schemes, whereby a synthesized quantum circuit utilizes the multiple physical qubits that are assigned to the groups of the one or more of logical qubits to represent the group of the one or more logical qubits in a manner reducing an error rate of the plurality of logical qubits.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
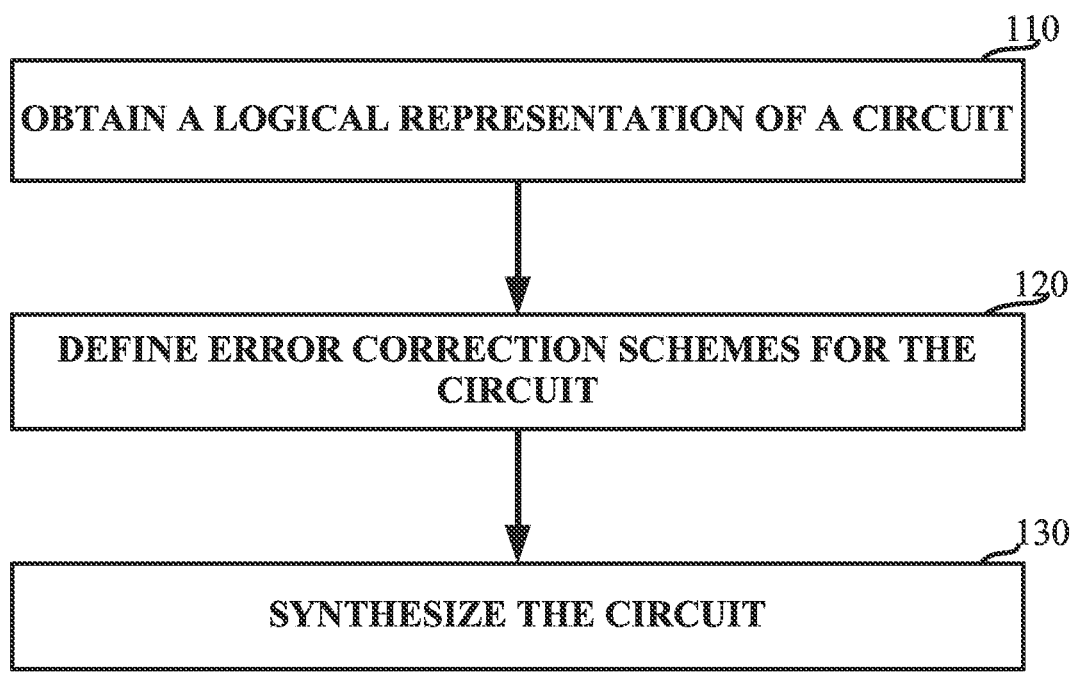
FIG. 1 shows an exemplary flowchart diagram of a method, in accordance with some exemplary embodiments of the disclosed subject matter.

One technical problem dealt with by the disclosed subject matter is to provide an error correction scheme for quantum programs. In some exemplary embodiments, error-correcting of quantum states may be challenging due to one or more properties of quantum computing. In some exemplary embodiments, in contrast to classic computing, quantum computing does not enable to copy quantum information, e.g., due to the no-cloning theorem of quantum computing. Copying content of a bit to a group of bits may be used in error correcting of classic computers, for identifying errors based on discrepancy between the values and correcting such errors using quorum decision. However, such technique may not be available in quantum computing. In some cases, quantum error correction may be challenging since quantum states must be corrected without measuring their content, as measurement operations may collapse the superpositions of the qubits. In some exemplary embodiments, quantum error correction may further be complicated by an entanglement property of qubits, causing qubits to destructively interfere with each other. In some exemplary embodiments, the entanglement properties of quantum states may cause localized errors on a few qubits to have a global impact on the exponentially large state space of many qubits.

In some exemplary embodiments, quantum error correction may be necessary for quantum computing, e.g., due to the decoherence property of qubits, which causes qubits to lose their quantum properties exponentially quickly in the presence of a constant amount of noise per qubit. In some exemplary embodiments, a qubit's state may be described by probability amplitudes. In some cases, errors in the qubit state probability amplitudes may propagate exponentially, if not corrected, causing the qubit state to become unusable. In some exemplary embodiments, quantum errors may also result from qubit initialization, measurement errors, qubit loss, qubit leakage, or the like. It may be desired to overcome such challenges and provide an error correcting scheme that enables to correct quantum errors before they are propagated to a next cycle, and reduce a noise level of quantum programs.

A first naïve solution for quantum error correction may comprise utilizing Noisy Intermediate-Scale Quantum (NISQ) algorithms, e.g., using noisy qubits, as disclosed in Noisy intermediate-scale quantum era. Wikipedia (Jan. 1, 2022), which is hereby incorporated by reference in its entirety for all purposes without giving rise to disavowment. In some exemplary embodiments, NISQ algorithms may be configured to take into account a noise of the qubits, without conducting error correction operations or utilizing additional qubits for the error correction operations. In some exemplary embodiments, NISQ algorithms may have one or more limitations, constraints, drawbacks, or the like. For example, in order to be usable, NISQ algorithms may be required to terminate fast (e.g., by performing less than a defined number of cycles). It may be desired to overcome such drawbacks.

A second solution may comprise utilizing quantum error correcting code that spreads information of one logical qubit onto a highly entangled state of several physical qubits. In some exemplary embodiments, this may enable to store the information of the logical qubit onto a highly entangled state of the physical qubits. In some exemplary embodiments, syndrome measurements may be used to determine whether a qubit has been corrupted. In some exemplary embodiments, it may be desired to utilize the qubit group representation technique in an efficient manner, e.g., without consuming qubits and other resources unnecessarily, in an inefficient manner, or the like.

Another technical problem dealt with by the disclosed subject matter is to enhance the qubit group representation technique, such as by finding an optimal configuration of the qubit group representation. It may be desired to provide an error correction scheme that spreads information of one logical qubit onto a highly entangled state of several physical qubits with an enhanced error reduction, an enhanced protection, or the like.

Yet another technical problem dealt with by the disclosed subject matter is to select an efficient distribution or assignment of physical qubits to logical qubits, e.g., as part of a qubit group representation. For example, it may be desired to find an optimal assignment of Physical Qubits (PQs) to Logical Qubits (LQs) that minimizes an error rate resulting from the assignment, that minimizes a cost function associated to the assignment, or the like.

In some cases, a first naïve solution for selecting an assignment of PQs to LQs may comprise assigning all of the available PQs to the LQs equally, semi-equally, or the like, such that each LQ is represented by a similar number of PQs. In case the number of PQs cannot be equally divided into the number of PQs, some LQs may be represented by one additional PQ or PQ group compared to other LQs. For example, in the case of sixty-one PQs and three LQs, two LQs may be each represented by twenty PQs, while the third LQ may be represented by twenty one PQs (thereby obtaining a semi-equal division). In some cases, continuous divisions of PQs to the LQs may not necessarily be enabled, and in such cases, a feasible division that is most equal may be used. For example, in case that LQs can be represented by groups of 20 PQs only, and 60 PQs are available to represent 2 LQs, a most equal division may include representing one LQ using one group of 20 PQs, and representing the second LQ using two groups of 20 PQs. In some cases, the first naïve solution may not be optimal in case where some qubits perform more operations than others, have a stronger effect than others on an output, or are prioritized over other qubits in any other way. For example, in case a first LQ is used only once during an execution of a circuit, the expected error rates of the first LQ are lower than an expected error rate of a second LQ that is manipulated by 6 gates during the execution, thus causing an equal assignment to result with high error rates of the second LQ, which may in many cases not be desired.

A second naïve solution may attempt to address this problem by attempting to reach a uniform error of all the LQs. For example, PQs may be assigned to LQs in a manner that is expected to result with an equal level of error rates for all participating LQs. In some exemplary embodiments, since some LQs may be noisier than others, such LQs may be represented by more PQs than others, thereby obtaining a same error rate for each LQ. In some cases, the second naïve solution may also be suboptimal, such as in case where some qubits affect the output more than others, perform more operations than others, or the like. For example, in case that a program includes 100 LQs, and only 10 LQs are measured at an end of an execution, the 10 measured qubits may be considered more important than the remaining 90 qubits, at least since the output of the circuit depends on them. According to this example, a total error of the circuit may be higher than when representing mostly the 10 measured qubits, indicating that this scenario is suboptimal. In some exemplary embodiments, it may be desired to overcome such drawbacks. For example, it may be desired to obtain an optimal allocation of PQs to LQs that minimizes a total error of the circuit, taking into account a role and priority of different qubits. Put differently, it may be desired to determine a number of PQs to allocate to each individual or group LQ, so that the overall circuit error is minimized.

Yet another technical problem dealt with by the disclosed subject matter is to provide a method of comparing an effectiveness of different error correction schemes, such as assignments of PQs to LQs. In some cases, it may be necessary to be able to compare performances of different error correction schemes, in order to find an optimal error correction scheme for a circuit.

One technical solution provided by the disclosed subject matter may comprise selecting one or more error correcting schemes for a quantum circuit, using a comparative predictor that is configured to estimate a quality of the quantum circuit with a comparative metric. In some exemplary embodiments, a search algorithm may be utilized, in combination with the predictor, in order to detect optimal error correcting schemes for the circuit.

In some exemplary embodiments, quantum circuits may be designed, programmed or created by a user, a programmer, an operator, or the like, using gate-level programming, using functional-level code, using evolutionary computing techniques such as Quantum Genetic Algorithm (QGA), using genetic algorithms, or the like. In some exemplary embodiments, after an initial quantum circuit is created, it may go through multiple stages before becoming an executable quantum circuit that can be executed with a quantum computer, a simulation software thereof, or the like. In some exemplary embodiments, during a compilation stage or transpilation stage, a physical representation for logically-represented circuit may be generated.

In some exemplary embodiments, the physical representation may be configured to implement an error correcting mechanism (e.g., including the error correction schemes). In some exemplary embodiments, the error correcting mechanism may be used to correct one or more errors, thus preventing from the errors to accumulate between cycles and become exponential. In some exemplary embodiments, the error correcting mechanism may be used to reduce quantum noise of logical qubits, to reduce an error rate of logical qubits, to reduce decoherence errors of the program, or the like.

In some exemplary embodiments, the error correcting mechanism may comprise allocating or distributing multiple physical qubits to represent a single logical qubit, a single group of one or more logical qubits, or the like. In some exemplary embodiments, a logical representation of a quantum circuit may be separated, dismantled, or the like, to multiple disjoint groups of one or more logical qubits. At least some of the disjoint groups of LQs may be represented by disjoint groups of two or more PQs. In some exemplary embodiments, multiple physical qubits that are allocated to represent a single group of one or more logical qubits may represent the logical qubit's state, such as by spreading the state and representing it, using entanglement properties. For example, a single LQ may be represented by multiple PQs, e.g., 100 qubits, thereby increasing a stability of the LQ's value, reducing an error rate thereof, or the like. As another example, a quantum computer that implements 200 logical qubits may utilize 200000 physical qubits for representing the logical qubits, thus presenting a ratio of 1000 physical qubits per logical qubit.

In some exemplary embodiments, in addition to representing LQs with multiple PQs, qubit errors may be corrected in combination with any other error correction operations, methods, or the like. For example, qubit errors may be corrected using methods disclosed in Wikipedia, "Quantum Error Correction", which is hereby incorporated by reference in its entirety for all purposes without giving rise to disavowment. In some exemplary embodiments, error correction may be performed using one or more correcting techniques, e.g., as described in Andersen, C. K., Remm, A., Lazar, S. et al. Repeated quantum error detection in a surface code. Nat. Phys. 16, 875-880 (2020), Cramer, J. et al. Repeated quantum error correction on a continuously encoded qubit by real-time feedback. Nat. Commun. 7:11526, which are hereby incorporated by reference in their entirety for all purposes without giving rise to disavowment.

In some exemplary embodiments, error correction may be applied in a computer with a high ratio of PQs per LQs, e.g., above a threshold, in which many PQs can be allocated to LQs. Above a certain ratio of PQs per LQ, the error rate may drop to zero or near zero. For example, a increasing a ratio of PQs per LQs may cause an error rate to drop from $10^{-5}$ to $10^{-7}$, indicating that the data represented by the LQs is increasingly stable, error-free, reliable, or the like. In some exemplary embodiments, a small ratio of physical qubits to logical qubits, e.g., below a threshold, may deteriorate the error level of a quantum computer. For example, an assignment in which a LQ is represented by 5 PQs, may result with the LQ having a higher error rate than an assignment in which the LQ is represented by 500 PQs.

In some exemplary embodiments, an 'LQ', as referred herein, may refer to an individual logical qubit, or to a group of one or more logical qubits, on which operations may be performed at a group level. For example, a single error correction operation may be applied on a group of two or more logical qubits together, as a group, to correct errors thereof. Similarly, a 'PQ' may refer to an individual physical qubit, or to a group of one or more physical qubits. In some exemplary embodiments, utilizing qubits at a group level may affect the results of the error correcting mechanism. In some cases, allocating a group of physical qubits to represent a group of one or more logical qubits may provide different results than allocating a first portion of the group of physical qubits to represent a first portion of the logical qubits, and allocating a remaining portion of the group of physical qubits to represent a remaining portion of the logical qubits, e.g., although in both cases the same PQs are used to represent the same LQs. For example, an error correcting mechanism may be more efficient when allocating 140 PQs to represent 2 LQs, compared to allocating 70 PQs for each LQs, or vice versa. According to this example, when allocating 140 PQs to represent 2 LQs as a group, a static or dynamic internal allocation may be determined to decide an internal allocation of the 140 PQs to the 2 LQs.

In some exemplary embodiments, a logical representation of a quantum circuit may be obtained. In some exemplary embodiments, the logical representation may comprise a plurality of LQs, which may be manipulated by gate operations in a plurality of cycles. In some exemplary embodiments, the LQs may comprise one or more output LQs, which may provide an output of the circuit. In some exemplary embodiments, it may be desired to determine an optimal allocation of PQs to the LQs. In some exemplary embodiments, the error rate of an LQ may depend on quantity of PQs representing the LQs, and may be calculated based thereon.

In some exemplary embodiments, the logical representation of the quantum circuit may be implementable by a plurality of alternative physical representations of the quantum circuit. In some exemplary embodiments, each alternative physical representation of the quantum circuit may implement the logical representation of the circuit with a different error correction mechanism or scheme, e.g., with a different allocation of PQs to LQs, or using any other different method or implementation of error correction techniques. In some exemplary embodiments, each alternative physical representation may comprise a plurality of PQs, which may be used to represent the plurality of LQs. In some exemplary embodiments, a number of the physical qubits may be greater than a number of the logical qubits, so that at least some logical qubits may be represented by multiple physical qubits. In some exemplary embodiments, an error correction scheme implemented by an alternative physical representation may be configured to apply error correction operations to a group of one or more logical qubits using multiple physical qubits, e.g., in accordance to an allocation of PQs to LQs (the number of PQs being greater than the number of LQs) that is defined by the alternative physical representation.

In some exemplary embodiments, an alternative physical representation of the circuit that implements one or more error correction schemes, may be selected from the plurality of alternative physical representations as comprising an optimal implementation. In some exemplary embodiments, the error correction schemes may be defined as optimal in case they comprise an optimal allocation of PQs to LQs that minimizes a total error of the circuit (e.g., of an output thereof), in case they take into account a role and priority of different qubits, in case they are enhanced compared to one or more alternatives, or the like.

In some exemplary embodiments, in order to select an optimal error correction scheme for a LQ, such as by selecting a physical representation of the circuit from the alternative physical representations, a quality estimator may be provided. The quality estimator may be configured to estimate a quality of each physical representation according to the error correction schemes it implements. In some exemplary embodiments, error correction schemes may be determined to be optimal, based on one or more quality evaluations of a circuit implementing the schemes. In some cases, error correction schemes may be evaluated according to an estimated total error rate of the circuit. The estimated total error rate of the circuit may be based on the individual error rates of the output LQs. The estimated total error rate may be defined to have an optimal value (e.g., a lowest value) in a non-uniform assignment of PQs to LQs. The estimated total error rate may be defined to have an optimal value when different LQs have different error rates (e.g., non-uniform error-rates).

In some exemplary embodiments, a predictor may be configured to predict or estimate an effect of different assignments of PQs for LQs on error rates of the circuit, on a performance of the circuit, or the like. In some exemplary embodiments, the predictor, also referred to as a quality measurer, may estimate a quality of a physical representation of a circuit implementing a selection of one or more error correction schemes, using one or more metrics, evaluators, functions, or the like. For example, the predictor may comprise a machine learning predictor, a heuristics-based predictor, or any other type of estimator, calculator, predictor, or the like. In some exemplary embodiments, the predictor may measure or estimate a quality score of a circuit, also referred to as an 'Algorithmic Quality (AQ)', in order to enable to compare the effects of error correction schemes implemented by different physical representations on a performance of the circuit, on an error rate of the outputs, or the like. In some exemplary embodiments, the quality score may be measured, estimated, simulated, a combination thereof, or the like, by the predictor.

In some exemplary embodiments, the quality score that is determined by the predictor may be configured to indicate an effect of the errors on the circuit, e.g., in terms of a number of executions that are needed to remedy the effects of the errors of the logical output qubits. For example, the quality score metric may indicate a ratio between a number of times that a circuit with a defined error correction scheme needs to be executed in order to obtain results of a theoretical error-free implementation of the circuit (also referred to as 'error-free circuit').

In some exemplary embodiments, the predictor may be used to provide a quality metric that is monotonically correlated to error rates of at least some LQs of the quantum circuit, such as logical output qubits of the circuit, when implementing each alternative physical representation. In some exemplary embodiments, the quality metric may be used to compute quality scores that are correlated, or oppositely correlated, to the error rates of the program, derivations thereof, or the like. For example, an increase in the quality score may indicate an increased error rate of at least some LQs. According to this example, a quality score of zero, may indicate that the circuit is error free. As another example, an increase in the quality score may indicate a decreased error rate of at least some LQs. In some cases, the predictor may utilize a quality function that decreases or increases the quality score monotonically, according to an error level of an inspected circuit. In some exemplary embodiments, any other measure of quality that is based on the errors of the logical qubits may be used, instead of or in addition to the quality score.

In some exemplary embodiments, changing an error correction scheme may affect a resulting quality score of the circuit, at least since the error rate of the circuit may be affected thereby. In some exemplary embodiments, different assignments of PQs to LQ may affect a quality score of the quantum circuit, even though a same number of PQs may be utilized overall to represent the LQs. For example, in case an error correction scheme includes an allocation of a majority of the physical qubits to a first logical qubit and not to a second logical qubit, the error rate of the first LQ may decrease while the error rate of the second LQ may increase. In case the first LQ is not used as an output qubit, and the second LQ is an output qubit, the overall error rate of the circuit may depend more on the second LQ, resulting with a decreased overall quality score of the circuit (compared to allocating the majority of PQs to the second LQ). In some exemplary embodiments, since some qubits may be manipulated by gates more than other qubits, may be used as output qubits, may affect an output more than others, or the like, they may have a stronger effect on an output of the circuit compared to other qubits, and their error rates may be more significant.

In some exemplary embodiments, the predictor may be configured to obtain, as an input, indications of a quantum circuit, including indications of gate types therein, cycles thereof, constraints thereof, error correction schemes implemented therein, or the like. In some exemplary embodiments, the quantum circuit may indicate a selected assignment of PQs to LQs, as part of the error correction schemes of the circuit. In some exemplary embodiments, the error correction schemes used by the circuit may be indicated as part of the circuit indication, or may be indicated separately.

In some cases, the predictor may be configured to determine an estimated error rate of one or more LQs in the circuit, e.g., of individual or group output LQs. In some cases, the predictor may obtain an indication of the error rates of the LQs, e.g., as part of the circuit indication, or may determine the error rates as a derivation from the circuit indication. In some exemplary embodiments, for a specific circuit with an assigned error correction scheme (including an allocation of PQs to LQs), known hardware parameters, or the like, an error rate for a specific LQ (group or individual) may be calculated. In some exemplary embodiments, the calculation may be performed analytically, heuristically, or the like. For example, an error rate of an LQ may be determined based on an assignment of PQs to the LQ in the respective error correction scheme.

In some exemplary embodiments, error rates of LQs may be determined based on error rates of PQs representing the LQs. In some cases, for a specific circuit with known hardware parameters, properties, or the like, an error for a specific PQ of the circuit may be calculated, obtained from a remote device, or the like. In some exemplary embodiments, given a set of one or more PQs, an error rate of the PQs may be determined based on a number and type of manipulating gates that manipulate the PQs, an elapsed timeframe from a start of the circuit, a number of cycles, based on a connectivity of the hardware qubits, a combination thereof, or the like. In some exemplary embodiments, after determining the error rates of each PQ, each set of PQs, or the like, error rates of LQs represented by the PQs may be determined, calculated, derived therefrom, or the like. In some exemplary embodiments, the determined or obtained error rates of the LQs may be utilized to determine a quality score of the circuit, or any other quality measure of the circuit.

In some exemplary embodiments, the predictor may measure a quality score of a circuit implementing one or more specific error correction schemes, based on estimated or measured error rates of output LQs of the program, impacts thereof, or the like. For example, the predictor may compare an estimated performance of the circuit, when having the determined error rates, to an estimated performance of the circuit without errors. In some exemplary embodiments, the predictor may measure the quality score based on any other parameters or quality measures, such as user-defined parameters, noise levels, metrics that depend on the error rates of the circuit's LQs, a cost function, or the like.

In some exemplary embodiments, the predictor may measure the quality score based on historic records of circuits that correspond to the error rates of the circuit. In some exemplary embodiments, the predictor may comprise a machine learning predictor, a data-driven predictor, or the like, that is trained to predict a quality of a program based on a dataset (e.g., a historic dataset). In some exemplary embodiments, the dataset may comprise records of circuits implementing different error correcting schemes, and corresponding quality scores labels thereof. In some exemplary embodiments, the predictor may be trained to predict a quality score of a new sample (e.g., a new circuit) based on the dataset.

In some exemplary embodiments, the dataset may be created by recording circuits, and outputs or properties of executions thereof. In some exemplary embodiments, the dataset may comprise data points of circuits, which may be collected by executing a circuit multiple times and sampling an output. For example, based on historic executions or simulations of each recorded circuit, quality scores of the circuits may be determined and retained in association with the circuit, e.g., as a label thereof. In some cases, the quality scores of the recorded circuits may be determined based on historic executions of the circuits, which may be compared to simulated executions of theoretical error-free executions of the circuits. For example, an algorithm may be executed 1,000 times on a theoretical error-free circuit, thereby enabling to sample some information of the output, such as resulting values, a resulting assignment, or the like, and the results may be compared to results of executions of the circuit on a quantum computer, e.g., to identify the effects of the errors on the results, a ratio between errors in both results, or the like.

In some exemplary embodiments, the predictor may be trained to predict a quality score of a new sample (e.g., a new circuit) based on the dataset, such as by interpolating new data points based on collected data points. In some exemplary embodiments, based on the dataset, the predictor may be trained to evaluate or estimate quality scores of new circuits, e.g., obtained as an input of the predictor. In some exemplary embodiments, the trained predictor may be used to measure a circuit's quality score as a function of its logical errors, e.g., without necessarily executing the circuit. In some exemplary embodiments, the trained predictor may be used to compare alternative implementations, or physical representations, of a logical quantum circuit, each of which implementing different error correction schemes.

In some exemplary embodiments, the trained predictor may enable to compare circuits, e.g., by comparing their quality scores. In some exemplary embodiments, the predictor may provide monotonic comparable results. For example, in case error rates of logical qubits in a first circuit are lesser than error rates of a second circuit, the quality score of the first circuit will always indicate a better quality that a quality score of the second circuit. As another example, in case error rates of output LQs of a first circuit are lesser than error rates of output LQs of a second circuit, the quality score of the first circuit will always indicate a better quality that a quality score of the second circuit.

In some exemplary embodiments, an optimal error correction scheme, including an allocation of PQs to LQs, may be obtained, determined, or the like, such as by comparing a quality score of all the alternative physical representations of a circuit, and selecting the circuit implementation that results with the optimal quality score. In some exemplary embodiments, an optimal allocation of PQs to LQs may comprise an allocation that minimizes a total error rate of the circuit, that provides an error rate that complies with constraints, or the like. For example, an optimal allocation may, in some cases, be indicated by a global optimum of a quality score, a local optimum thereof, or the like. In some cases, exhaustively measuring a quality score of all possible alternative physical representations may be computationally consuming, time consuming, memory consuming, infeasible, or the like. It may be desired to locate an optimal alternative physical representation without exhaustively measuring a quality score of all potential alternative physical representations.

In some exemplary embodiments, instead of exhaustively measuring a quality score of all alternative physical representations, which may not be feasible, one or more search algorithms may be deployed to search for an optimal alternative physical representation. In some exemplary embodiments, the search algorithm may comprise a gradual assent algorithm, a hill climbing algorithm, or any other local or global search algorithms. In some exemplary embodiments, search algorithms may only be used to search for alternative physical representations with Quantum Error Correction Scheme (QECS) that support the respective assignment of PQs to LQs.

In some exemplary embodiments, a search algorithm may be implemented on a plurality of alternative physical representations of the quantum circuit, each of which implementing the logical representation using different error correction schemes. In some exemplary embodiments, the search algorithm may be used to determine an assignment of N physical qubits to M logical qubits, where N is greater than M. In some exemplary embodiments, the assignment of the N physical qubits to the M logical qubits may be addressed as a search problem, in which a solver attempts to find an optimal allocation with minimal computational costs, errors, or the like. In some exemplary embodiments, approaching the alternative physical representations as a search space with an objective function may enable to find an optimal error correction scheme for each LQ without evaluating every possible error correction scheme.

In some exemplary embodiments, a solution for the search problem, such as a global optimal assignment of PQs to LQs, a local optimum assignment of PQs to LQs, a sufficiently good assignment, or the like, may be determined, calculated, found, or the like, e.g., using the one or more search algorithms. In some exemplary embodiments, the optimal assignment of PQs to LQs may be used to define the error correction schemes for the quantum circuit. In some exemplary embodiments, the quantum circuit may be synthesized using the error correction schemes, such as by utilizing the selected assigned PQs to represent the LQs of the circuit in a manner reducing an error rate of the circuit's output.

It is noted that the term 'optimal', as used herein, may refer to a solution that comprises a global optimum, a local optimum, or neither. In some cases, an optimal solution may refer to a solution that complies with one or more thresholds, that complies with one or more constraints, is within a defined range of sufficiently good results, is within a defined percentile of the results, or the like. In some cases, obtained results may depend on a type of search algorithm that is used to detect solutions, on termination conditions of the search algorithm, or the like. For example, a search algorithm may be configured to terminate upon finding an assignment of PQs to LQs that complies with one or more constraints, and a resulting assignment that complies with the constraints may be considered optimal even in case that the solution does not comprise a local or global optimum.

One technical effect obtained by the disclosed subject matter is enabling to find an optimal assignment of PQs to LQs, that enhances the error correction schemes of a synthesized circuit. In some exemplary embodiments, defining the assignment of PQs to LQs as a search problem, and defining the quality score as an objective function, may together enable to provide optimized error correction schemes.

Another technical effect obtained by the disclosed subject matter is defining a quality metric for comparing qualities of circuits, and providing a predictor that is trained to predict a quality score of circuits using the quality metric. In some exemplary embodiments, the quality metric that is defined herein, may be monotonically correlated to an error rate of the circuit's output qubits. In some exemplary embodiments, training a predictor to measure a program's quality may enable to compare a quality of different allocations of PQs to LQs for a circuit.

Yet another technical effect obtained by the disclosed subject matter is enabling to enhance a quantum error correction using asymmetrical allocation of physical qubits to logical qubits. In some exemplary embodiments, instead of dividing the PQs equally along the LQs, the disclosed subject matter provides for performing an asymmetrical allocation that takes into account a noise of each qubit individually, a role of the qubits (whether the LQ is an output qubit), or the like.

Yet another technical effect obtained by the disclosed subject matter is to provide a utilization scheme of limited set of resources of the quantum computer to improve, and potentially optimize, the accuracy of the computations performed by the quantum computer. Such utilization scheme is provided while using potentially reduced amount of computation and memory resources.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing an exemplary flowchart diagram of a method, in accordance with some exemplary embodiments of the disclosed subject matter.

On Step 110, a logical representation of a quantum circuit may be obtained. In some exemplary embodiments, the logical representation may comprise a plurality of LQs, subsets thereof, or the like, which may be manipulated by gate operations in a plurality of cycles. In some exemplary embodiments, the LQs may comprise one or more output qubits, through which the logical representation of the quantum circuit may be configured to provide an output.

In some exemplary embodiments, the logical representation of the quantum circuit may be implementable by a plurality of alternative physical representations of the quantum circuit, each of which implementing the logical representation with different error correction schemes or mechanisms. For example, each alternative physical representation may comprise a different allocation of PQs to LQs at a start of the circuit, e.g., at an initial cycle thereof. In some exemplary embodiments, each alternative physical representation may comprise a plurality of PQs (a greater number of PQs than LQs), which may be manipulated over a plurality of gates over a plurality of cycles.

In some exemplary embodiments, each assignment of PQs to LQs may be performed using one or more techniques, algorithms, or the like, such as by using a surface code technique. As an example, surface code may comprise an error correction scheme in which PQs may be distributed among LQs, and enable operations between them, as disclosed, for example, in Fowler et al. "Surface codes: Towards practical large-scale quantum computation" Phys. Rev. A 86, 032324— Published 18 Sep. 2012, which is hereby incorporated by reference in its entirety for all purposes without giving rise to disavowment.

On Step 120, error correction schemes may be defined for the quantum circuit, e.g., based on quality scores of the alternative physical representations.

In some exemplary embodiments, an error correction scheme of a group of one or more LQs may be configured to apply error correction operations for the LQ, such as by assigning multiple PQs thereto. For example, according to an error correction scheme, a group of one or more logical qubits may be represented by multiple (two or more) physical qubits. In some exemplary embodiments, a number of the multiple physical qubits that represent the logical qubits may be greater than a number of the logical qubits in the group of the one or more logical qubits. For example, in case the LQ comprises two individual qubits, the number of PQs may comprise at least three qubits. In some exemplary embodiments, the error correction schemes may differ in the error correction techniques in addition to or instead of in the assignment of PQs to LQs.

In some exemplary embodiments, the error correction schemes may be defined by implementing a search algorithm on the plurality of alternative physical representations of the quantum circuit. In some exemplary embodiments, the search algorithm may comprise a local search optimizer, a global search optimizer, or the like. For example, the search algorithm may comprise a gradient descent algorithm, a hill climbing algorithm, or the like. In some exemplary embodiments, the search algorithm may be configured to search the plurality of alternative physical representations, for detecting therein a physical representation of the quantum circuit with an optimal assignment of PQs to LQs.

In some exemplary embodiments, the optimal assignment may be defined in view of quality scores of alternative physical representations of the circuit. In some exemplary embodiments, the optimal assignment may comprise an assignment with non-uniform LQ error rates, such as an assignment in which at least two LQs have different error rates. In some exemplary embodiments, the quality scores may be configured to be monotonically correlated to error rates of the logical output qubits, when implementing each alternative physical representation. In some exemplary embodiments, the quality score may indicate an effect of the error rates of the circuit on an output.

In some exemplary embodiments, a quality measurer (corresponding to the predictor disclosed herein) may be used to compute the quality score. In some exemplary embodiments, the quality measurer may be generated locally, such as by training a predictor to estimate a quality of circuits based on their error rates, costs, or the like. In some exemplary embodiments, generating the quality measurer may comprise obtaining a dataset storing a set of assignments of PQs to LQs and computed quality scores relating thereto, and generating the quality measurer based on interpolation of the set of assignments and computed quality scores relating thereto. For example, the dataset may comprise records of circuits, and may be labeled with quality scores indicating a ratio between one or more properties of the circuit, when being executed with and without errors. For example, the quality score of a record may indicate a ratio between rates of correct results sampled by executing the circuit theoretically, without errors, and by executing the circuit in practice, with errors. As another example, the quality score of a record may indicate a ratio between a number of executions of the circuit that is needed to be implemented in order to obtain a certain result, with and without errors. As another example, the quality score of a record may indicate any other effect of the errors on the results, any other ratio between a theoretical execution of the circuit and an actual execution of the circuit, or the like. In some cases, the dataset may indicate sampled results for multiple execution counts, e.g., for 1,000 executions, 2,000 executions, or the like. Alternatively, instead of generating the quality measurer, the quality measurer may be obtained, e.g., from a third party, a remote server, or the like, after being trained elsewhere.

In some exemplary embodiments, the quality measurer may be configured to compute a quality score of a quantum circuit with defined error correction schemes, based on a number of physical qubits representing logical qubits according to the error correction schemes, based on a type of error correction schemes utilized, based on properties of the utilized error correction schemes, or the like. In some exemplary embodiments, the quality score may indicate an effect of the error rates of the circuit, e.g., of output LQs thereof. In some exemplary embodiments, the error rates may be determined based on the error rate of each logical qubit in the program, which may depend on a number of PQs representing each logical qubit.

In some exemplary embodiments, the quality measurer may be configured to compute a quality score that indicates the effect of the error rates, such as by indicating a ratio between executions of a theoretical error-free representation of the circuit, and the actual circuit, which may have errors. In some cases, results from the theoretical error-free representation may be determined by executing a simulator. In some exemplary embodiments, a result of executing the theoretical error-free representation of the circuit may be considered as an optimal result quality for the circuit, and the circuit quality may be determined with respect to the result of the error-free circuit.

In some exemplary embodiments, the quality score may be determined based on a ratio between a number of executions of a theoretical, error-free, representation of the quantum circuit that are needed to be performed in order to obtain a predetermined number of correct outputs, and a number of executions of the quantum circuit that implements the error correction schemes on a quantum computer, which are needed to be performed in order to obtain the same predetermined number of correct outputs. In some exemplary embodiments, since the logical qubits of the circuit may be noisy, it may be required to execute the program with the noisy qubits more time than a theoretical non-noisy representation of the circuit, in order to obtain the same amount of information, e.g., a same percentage of correct result samples. For example, the dataset may comprise a record indicating that a circuit with certain LQ errors was executed 2,000 times using a quantum computer and reached accurate results in 1.2% of the outputs. In case that a theoretical representation of the circuit needs to be executed 1,000 times only to obtain the 1.2% rate of accurate results, the quality score of the record may be determined to have a value of '2' (e.g., since a ratio between 1,000 times and 2,000 times is 2). As another example, a theoretical error-free circuit may be determined to have 4.5% of correct samples in average, when being executed 1,000 times. According to this example, in case executing the circuit using a quantum computer for 1,000 times results with 1.5% of correct samples in average, the quality score of the circuit may be determined to be 3. As another example, in case a probability of a theoretical error-free representation of the circuit to achieve a correct result is one in thousand, the probability may be half the probability in a real device implementation, e.g., one in two thousand, which may be indicated by a quality score of 2. As another example, in case a rate of inaccurate outputs of a theoretical error-free representation of the circuit is 1.05% (for example, inaccurate results for a traveling salesman problem), and a rate of inaccurate outputs of the circuit, when using a quantum computer, is 1.1%, the quality score of the circuit may be determined to be 1.1/1.05, e.g., 1.0476.

In some exemplary embodiments, the quality score may be determined based on a distance metric between a distribution provided by a theoretical representation of the quantum circuit, which may be error-free, and a distribution provided by executing the quantum circuit that implements the error correction schemes on a quantum computer. In some cases, the distribution provided by executing the quantum circuit using the quantum computer may be determined by performing multiple executions of the quantum circuit and sampling outputs of the multiple executions. For example, a quality score of 3 may indicate that in order to obtain the same distribution of results that is obtained from using the error-free theoretical representation, the circuit would need to be executed three times as much (e.g., instead of executing X times, the quantum circuit needs to be executed 3× times). In other cases, the quality score may indicate any other ratio or difference between an error-free representation of the circuit, and the actual circuit outputs, rates thereof, executions thereof, samples thereof, or the like.

In some cases, the quality measurer may be trained to estimate a quality score of different types of circuits is a specifically-tailored manner, e.g., using specifically tailored functions for respective types of algorithms. For example, for sampling algorithms in which a correct value is sampled from multiple outputs of executions, the quality measurer may estimate a ratio between a number of executions of the circuit that are required to be performed in order to obtain a defined rate of correct samples, with and without errors. As another example, for assignment algorithms in which a distribution is searched for, the quality measurer may estimate a distance between a distribution of results of a theoretical error-free implementation of the circuit, and between a distribution of results that were sampled after executing the actual circuit. In other cases, the quality measurer may be trained in any other way, such as to uniformly estimate a quality score of any type of algorithm.

In some exemplary embodiments, the quality measurer may be based on a machine learning predictor, deep learning predictor, or the like, implementing artificial intelligence techniques to predict the quality score of a circuit. In some cases, the predictor may be trained using a training set, which may include circuits, LQs to PQs assignments, and a label indicating the quality score. The training set may be determined based on executions of the quantum circuit, such as using the methods described above. The trained predictor may be utilized to predict a quality score to a new circuit having a specific LQs to PQs assignment, without executing (or simulating execution of) the new circuit, let alone without repeatedly executing the new circuit a plurality of times, thereby preserving computational resources.

In some exemplary embodiments, a search algorithm may be implemented by applying the quality measurer on one or more generated circuits, on one or more simulated circuits, on one or more executed circuits, or the like. For example, the search algorithm may send, as input, one or more implementations of a circuit with different error correction schemes to the quality measurer, and the quality measurer may provide, in return, a quality score of the circuit. In some exemplary embodiments, the quality measurer may determine a quality score of a circuit without being required to execute the circuit. In other cases, the circuit may be executed to determine properties of its output, to enhance the dataset, or the like.

In some exemplary embodiments, the optimal assignment of PQs to LQs, which may be determined based on one or more search algorithms, may be used to define error correction schemes for the quantum circuit. For example, the error correction schemes may be defined to include an optimal assignment of PQs for each LQ. As another example, the error correction schemes may be defined to correspond to error correction schemes used by a physical representation of the circuit that was sent to the quality measurer and obtained the optimal quality score. In some exemplary embodiments, the error correction schemes for the quantum circuit may be defined by defining, for a first LQ, a first error correction scheme that utilizes a first set of PQs (where the number of PQs is greater than the number of LQs), and defining for a second set of LQs, a second error correction scheme that utilizes a second set of PQs (where the number of PQs is greater than the number of LQs). In some exemplary embodiments, the first set of physical qubits and the second set of physical qubits may be disjoint sets, e.g., without overlapping qubits. The first LQ and the second set of LQs may be disjoint.

On Step 130, the quantum circuit may be synthesized using the defined error correction schemes. In some exemplary embodiments, a synthesized quantum circuit may utilize the multiple PQs that are assigned to the group of the one or more LQs to represent the group of LQs in a manner reducing an error rate of the LQs.

Another technical problem dealt with by the disclosed subject matter may include determining an optimal error correction scheme in a dynamic framework. In some exemplary embodiments, a dynamic framework may enable PQs to be used to dynamically represent different LQs along a single quantum program, such as by using a transfer operation during a circuit execution. In some exemplary embodiments, a transfer operation may be configured for transferring physical qubits from representing one logical qubit of a circuit to representing another logical qubit of the same circuit. For example, during an execution of a circuit, a transfer may be performed multiple times between two logical qubits, between more than two logical qubits (e.g., from a first LQ to a second LQ, and from the second LQ to a third LQ), or the like.

In some exemplary embodiments, a transfer operation, configured to dynamically move PQs among LQs, may be performed using respective error correction logic, techniques, or the like, such as using a surface code scheme, a dynamical code-switching scheme, a dynamic compiler, or the like. As an example, surface code may comprise an error correction scheme in which PQs may be distributed statically or dynamically among LQs, e.g., as disclosed in "Surface codes: Towards practical large-scale quantum computation", cited above. In some exemplary embodiments, the transfer operation may be performed according to one or more methods such as a dynamic compiler, also referred to as a 'code teleportation' and 'dynamic code switching', e.g., as disclosed in Simon J Devitt et al, "Quantum error correction for beginners" 2013 Rep. Prog. Phys. 76 076001, M. Oskin et al, "A practical architecture for reliable quantum computers", Computer, Volume 35, Issue 1, pp. 79-87, which are hereby incorporated by reference in their entirety for all purposes without giving rise to disavowment.

In some exemplary embodiments, a transfer operation may be implemented by a swap function, or using any other quantum operations, functions, instructions, gates, or the like. For example, for a circuit comprising 2 LGs and 100 PQs, 90 PQs may be allocated to the first qubit, and then, during the execution, may be dynamically allocated to the second qubit using a swap function. In some exemplary embodiments, the swapping function may comprise a real time dynamic switching of qubits, e.g., not a re-allocation operation.

In some exemplary embodiments, the transfer operation may comprise an operation that is defined between individual PQs, group PQs, a combination thereof, internally within a group of PQs, or the like. As an example, a circuit may comprise two logical qubits, each being manipulated over many one-qubit operations, e.g., using one-qubit gates. In some exemplary embodiments, instead of merely assigning, at a first cycle of the circuit that precedes other cycles, some of the physical qubits to the first logical qubit and other physical qubits to the second logical qubit, a dynamic framework may be implemented. In some exemplary embodiments, using the transfer operation, the dynamic framework may assign most PQs to the first LQ for performing its operations, and then, after most or all of the operations of the first LQ are completed, transfer the PQs to represent the second LQ, for performing the operations of the second LQ. According to this example, the same PQ may be transferred to represent different LQs. In some exemplary embodiments, a transfer operation between two or more LQs may be performed once, twice, or any other number times, during a single circuit execution.

In some exemplary embodiments, it may be desired to obtain optimal error correction schemes for a circuit, indicating how to distribute PQs among the LQs when using the dynamic framework.

Yet another technical problem dealt with by the disclosed subject matter may comprise overcoming a computational challenge of the dynamic framework. In some exemplary embodiments, when implementing the dynamic framework, an optimal allocation may be searched for in a complex search space that enables dynamic transfers of PQs to LQs. In some exemplary embodiments, the search space may be complex, at least since the allocation selection must select not only an initial assignment of PQs to LQs, but a continuous one that can change during execution of the circuit. In some exemplary embodiments, the potential dynamic allocations may comprise a large number of valid optional allocations, and it may not be computationally feasible to determine and evaluate a quality of each such option. In some cases, each PQ may be allocated, in each cycle, to any LQ (in some cases, under one or more constraints), causing the number of potential allocations to grow exponentially with the number of cycles, the number of LQs, or the like.

Yet another technical problem dealt with by the disclosed subject matter may comprise overcoming a timing challenge of the dynamic framework. In some exemplary embodiments, when implementing the dynamic framework, a timing of each transfer operation may be selected for each alternative implementation. In some exemplary embodiments, it may be desired to time a transfer operation in an efficient manner, such that a harm to a previously represented LQ (from which PQs are moved) is minimized, and a benefit to the newly represented LQ (to which PQs are moved) is maximized.

One technical solution provided by the disclosed subject matter may include modifying a logical representation of a quantum circuit, and scheduling transfer operations for the modified quantum circuit. For example, gates of the logical representation may be delayed to a cycle in which an error of a transfer operation may be minimized, e.g., as illustrated in FIG. 3, without changing a functionality of the logical representation. In some exemplary embodiments, the scheduling of the transfer operations may be limited to one or more defined cycles ('border cycles'), that are estimated to optimize transfer operations, optimize error correction schemes, or the like, thus narrowing a search space and saving computational power, time resources, or the like.

In some exemplary embodiments, a logical representation of a quantum circuit may be obtained. In some exemplary embodiments, the logical representation may comprise a plurality of LQs, which may be manipulated by gate operations in a plurality of cycles. In some exemplary embodiments, the LQs may comprise one or more logical output qubits, which may provide an output of the circuit.

In some exemplary embodiments, a search space for searching for an optimal dynamic allocation of PQs to LQs, may comprise an extensive number of possible error correction schemes, which may be exponentially larger than a search space for static allocations of PQs to LQs. In some exemplary embodiments, in order to make the search space manageable, the search space may be reduced to include only error correction schemes that perform optimal transfer operations at border cycles. In some exemplary embodiments, the modified search space may be obtained by restricting transfer operations to border cycles.

In some exemplary embodiments, border cycles may comprise one or more defined cycles, for each LQ, that differentiates between two phases of the LQ: a relatively noisy or intensive phase of the qubit, and a relatively idle phase of the qubit's lifecycle. In some cases, a border of a qubit may differentiate between a stage in which the qubit is used by gates many times, e.g., above a predetermined threshold, above an average number of times, at a greater rate that another stage, or the like, and a stage in which the qubit is used a small number of times (or not at all), e.g., below the threshold, below the average number of times, below a 25 percentile, or the like. For example, the border cycles may be determined based on an estimated error rate of a qubit that is accumulated at each phase, a number of gates manipulating the qubit in each phase, a type of gates manipulating the qubit at each phase, an average estimated noise of the qubits at each phase, or the like.

In some cases, a delta, or difference between stages that complies with a threshold, may enable to define the cycle separating between the stages as a border cycle. For example, a level of noise, or error, that is estimated to be obtained by a manipulation of a LQ by gates during two disjoint phases may be compared to a noise threshold. As another example, a ratio between a level of noise that is estimated to be obtained by a manipulation of a LQ by gates during two disjoint phases may be determined, and compared to a ratio threshold.

In some cases, the border cycles may comprise a suboptimal separation to phases. For example, a border cycle of a first LQ may comprise a same cycle as a border cycle of a second LQ, which may prevent a set of PQs from representing both LQs using a transfer operation. For example, in case two or more LQs are manipulated in parallel by respective gates, the border cycle may comprise a same cycle after the respective gates, and a transfer operation performed then may be suboptimal, at least since the PQ resources must be split between the first and second LQs, instead of transferring the resources first to one LQ and then to another. In some exemplary embodiments, it may be desired to delay operations of the second LQ, if possible without adversely affecting the circuit's functionality, until operations of the first qubit are mostly completed (e.g., above a threshold), thus enabling to transfer the PQs from representing the first qubit to representing the second qubit, and enhancing error correction capabilities of both qubits.

In some cases, the logical representation of the circuit may be modified, such as by transferring at least one gate operation defined in one or more first cycles, to be performed instead in one or more second cycles (e.g., as depicted in FIG. 3). In some exemplary embodiments, in case parallel gates are configured to manipulate different LQs during same cycles, at least one of the gates may be moved to a different cycle, such that the gates may be performed in a sequence. In some exemplary embodiments, moving gates to be performed in a sequence may enable each gate operation to utilize a set of PQ resources fully, without sharing the PQ resources with the second gate. In some cases, a single modified logical representation of the circuit may be generated. In other cases, multiple modified logical representations of the circuit may be generated.

In some exemplary embodiments, the modified logical representation of the circuit may comprise one or more gates that are delayed to a time in which an error rate can be reduced, in which sequential gate operations are possible, or the like. In some exemplary embodiments, the modified logical representation of the circuit may comprise one or more gates that are moved to earlier cycles, to a time in which an error rate can be reduced, in which sequential gate operations are possible, or the like. In some exemplary embodiments, the modifications of the circuit may be performed according to one or more constraints, e.g., hardware constraints of an underlying quantum computer, user constraints such as time limits, precedence constraints between blocks of functionality of an implemented quantum program, or the like. For example, gate operations may be delayed in time, or moved earlier in time, in case the change complies with one or more constraints of the circuit.

In some exemplary embodiments, one or more modified logical representations of the quantum circuit may enable to define a new search space for searching for optimal dynamic allocations of PQs to LQs. In some exemplary embodiments, a plurality of alternative physical representations of the quantum circuit, may implement the modified logical representations. In some exemplary embodiments, each alternative physical representation may implement a modified logical representation with a different error correction scheme, e.g., using a different dynamic allocation of PQs to LQs at border cycles of the circuit. In some exemplary embodiments, each alternative physical representation may comprise a plurality of PQs (a greater number of PQs than LQs), which may be manipulated over a plurality of gates over a plurality of cycles.

In some exemplary embodiments, a search space for searching for the optimal dynamic allocation of PQs to LQs, may comprise the plurality of alternative physical representations. In some exemplary embodiments, the search space may be defined based on potential transfer operations, circuit modifications, objective functions, or the like, thus enabling to search for optimal dynamic assignments therewithin. In some cases, limiting the transfer operations to border cycles may reduce a volume of the search space, thus saving computational power, timer resources, or the like. In some cases, modifying the logical representation to optimize the border cycles may ensure that limiting the transfer operations to border cycles does not deteriorate the results.

In some exemplary embodiments, a scheduling scheme may be utilized to determine, generate, or the like, one or more dynamic assignments of PQs to LQs. In some exemplary embodiments, the scheduling scheme may be configured to schedule a dynamic allocation of PQs to LQs, in which at least some PQs are transferred from representing a first LQ to representing a second LQ during a border cycle, using the transfer operation. In some exemplary embodiments, the scheduling scheme may utilize the predictor or quality measurer disclosed herein to determine quality scores of physical representations that implement the dynamic assignments. In some exemplary embodiments, the quality scores may be utilized to select an optimal error correction scheme for the circuit. In some exemplary embodiments, a quality of one or more quantum circuits may be measured by a predictor, e.g., a same predictor as described above, a different predictor, or the like.

In some exemplary embodiments, the predictor may be configured to obtain an indication of a circuit, one or more derivable properties of the circuit, or the like, and provide a quality score based thereon. For example, the predictor may be trained to obtain an indication of a circuit, implementing a dynamic allocation of PQs, and determine based thereon a quality score of the circuit, of an objective function thereof, or the like. In some exemplary embodiments, the predictor may comprise a machine learning predictor that is trained using the same dataset that is describe above, or using a different dataset. For example, the dataset may comprise records of circuits that implement different dynamic allocations, and associated quality scores thereof. In some exemplary embodiments, the predictor may be trained to interpolate scores of new circuit representations based on the dataset.

In some exemplary embodiments, the predictor may determine a quality score of the circuit based on error rates of logical qubits, impacts of the errors, resource consummation thereof, costs of the transfer operations, or the like. In some exemplary embodiments, a transfer operation may have a cost in time, cycles, computational resources, and in error rates, which may affect the quality score of the circuit. In some cases, costs of transfer operations may be derivable from a circuit indication.

In some exemplary embodiments, a physical representation of a quantum circuit that implements dynamic error correction schemes with an optimal quality score may be selected for synthesizing. In some exemplary embodiments, the selected quantum circuit may be synthesized using the dynamic error correction scheme. For example, the dynamic error correction scheme may implement error correction operations, including dynamic assignments of PQs to LQs using a first assignment of first PQs to a LQ for a first set of cycles and using a second assignment of second PQs to the same LQ for a second set of cycles.

In some exemplary embodiments, instead of exhaustively measuring a quality score of the potential physical representation, which may be computationally intensive, infeasible, or the like, one or more search algorithms may be deployed. In some exemplary embodiments, the search algorithms may be used to select circuit representations that enable the transfer operations to enhance their reach. In some exemplary embodiments, the search algorithms may be configured to provide to the predictor, as input, an indication of a modified circuit, an indication of a dynamic assignment of PQs to LQs in the circuit, costs of transfer operations, or the like, and obtain quality scores of the circuit based thereon.

One technical effect obtained by the disclosed subject matter is enabling to dynamically transfer, or swap, PQs between represented LQs, such as according to a load of each LQ, which may be indicated by a border cycle. In some exemplary embodiments, a resulting QEC scheme comprises an asymmetrical allocation of physical qubits to logical qubits that changes during the execution of the program, and is non-uniform across the time. For example, a LQ may be represented by many PQs at a beginning of a circuit execution, and by less PQs at an end of the circuit execution.

Another technical effect obtained by the disclosed subject matter is limiting the transfer operations to border cycles, which may save computational power of the predictor without degrading a quality of the result.

Yet another technical effect obtained by the disclosed subject matter is enabling to modify the circuit in order to increase an effectiveness of the transfer operations. For example, parallel gates may be implemented sequentially, in a logical representation of the circuit, so that both gates may be implemented using a larger number of PQs resources, e.g., as depicted in FIG. 3.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 2:
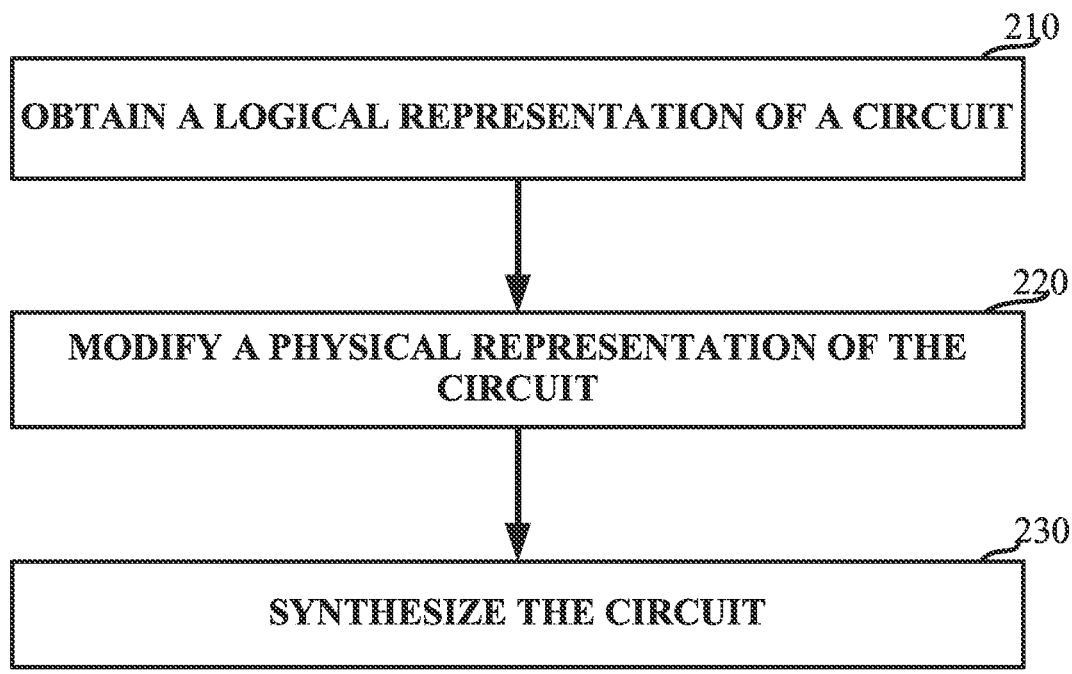
FIG. 2 shows an exemplary flowchart diagram of a method, in accordance with some exemplary embodiments of the disclosed subject matter.

Referring now to FIG. 2, showing an exemplary flowchart diagram of a method, in accordance with some exemplary embodiments of the disclosed subject matter.

On Step 210, a logical representation of a quantum circuit may be obtained. In some exemplary embodiments, the logical representation may comprise a plurality of LQs, which may be manipulated by gate operations in a plurality of cycles. For example, gate operations may manipulate subsets of the LQs. In some exemplary embodiments, the LQs may comprise one or more logical output qubits, which may provide an output of the circuit.

On Step 220, the logical representation of the quantum circuit may be modified, e.g., thereby obtaining one or more modified logical representations. In some exemplary embodiments, the modification may be performed in order to obtain optimized border cycle timings, optimized transfer operations, or the like. For example, the modification may be performed in order to cause parallel gates to be performed sequentially, thereby enabling to enhance an efficiency of transfer operations, e.g., as illustrated in FIGS. 3A-3B.

Figure 3A:
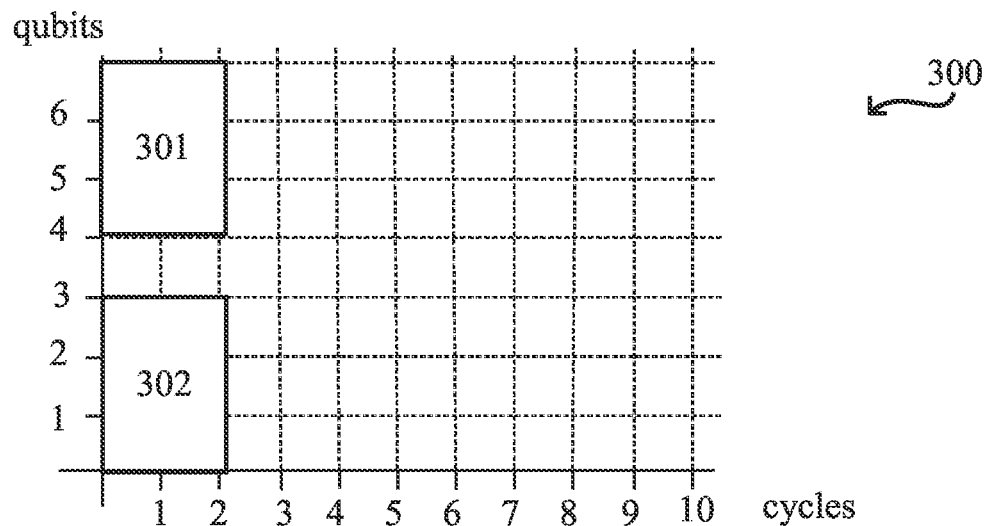
FIGS. 3A-3B illustrate exemplary quantum circuits, in accordance with some exemplary embodiments of the disclosed subject matter.

Referring now to FIG. 3A, showing an exemplary Quantum Circuit 300, in accordance with some exemplary embodiments of the disclosed subject matter. In some exemplary embodiments, Quantum Circuit 300 exemplifies a logical quantum circuit implementing at least two circuits in parallel, e.g., Circuits 301 and 302. Each circuit is illustrated as a rectangular area showing the LQs which are utilized thereby and the number of cycles of the circuit. For example, as illustrated in FIG. 3A, Circuit 301 of Quantum Circuit 300 may comprise one or more gates that manipulates qubits 4-6 during cycles 0-2, and Circuit 302 may comprise one or more gates that manipulates qubits 0-3 during cycles 0-2.

In some exemplary embodiments, one or more error correction schemes for Circuit 301 may include representing qubits 4-6 using a set of PQs. In some exemplary embodiments, an error correction scheme for Circuit 302 may include representing qubits 0-3 using remaining PQs, which may comprise a disjoint set of PQs. In some cases, the available PQs for Circuits 301 and 302 must be divided between Circuits 301 and 302, since they are parallel to one another. For example, in case 100 PQs are available for representing qubits that are manipulated by Circuits 301 and 302, the PQs may be divided to two disjoint groups of PQs that can represent the LQs manipulated by Circuits 301 and 302. The number of PQs allocated to each LQ may be dynamically modified during execution, but they will always comprise two disjoint groups. For example, at a first cycle, 70 PQs may be allocated to the LQs of Circuit 301, and the remaining 30 PQs may be allocated to the LQs of Circuit 302. At one or more second cycles, 20 of the PQs that were allocated to the LQs of Circuit 301 may be transferred to Circuit 302, resulting with an allocation of 50 PQs to each circuit.

Figure 3B:
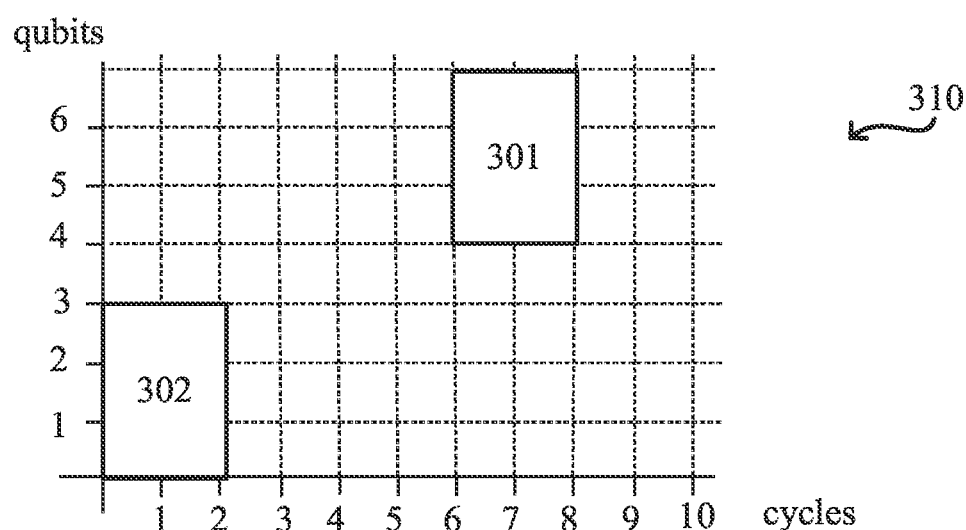

Referring now to FIG. 3B, showing an exemplary Quantum Circuit 310, in accordance with some exemplary embodiments of the disclosed subject matter. In some exemplary embodiments, Quantum Circuit 310 may be obtained by modifying Quantum Circuit 300. In some exemplary embodiments, Quantum Circuit 310 may be obtained by modifying Quantum Circuit 300 to transfer one of its circuits, e.g., Circuit 301, to one or more subsequent cycles that do not overlap with the cycles of Circuit 302, thereby obtaining a modified circuit, e.g., Quantum Circuit 310. In some exemplary embodiments, Quantum Circuit 310 may be configured to provide a same functionality as Quantum Circuit 300, but with a different order of circuit manipulations. In some exemplary embodiments, the logical representation of Quantum Circuit 300 may be modified in order to obtain optimized border cycle timings, optimized transfer operations, a more balanced load of computations between border cycles, or the like.

In some exemplary embodiments, the modification may be performed by causing parallel circuits such as Circuits 301 and 302 of Quantum Circuit 300 to be performed sequentially as depicted in Quantum Circuit 310, thereby enabling all or most of the available PQs to represent each of Circuits 301 and 302 separately. For example, in case 70 PQs are available for both circuits of Quantum Circuit 310, all of the 70 PQs may be utilized for representing LQs of Circuit 302 at cycles 0-2, and then all of the 70 PQs may be utilized again for representing LQs of Circuit 301 at cycles 6-8 (e.g., using transfer operations). In some exemplary embodiments, the modification may be performed based on one or more constraints, such as based on constraints of performing transfer operations, user constraints, functionality constraints, or the like. For example, the transfer operations may utilize resources, such as cycles, and it may be desired to separate the circuits in a manner that enables to perform transfer operations between LQs of the circuits.

In some exemplary embodiments, causing the parallel circuits to become sequential may enable to enhance the error correction schemes of Quantum Circuit 310, such as by enabling a better utilization of the PQ resources. For example, in case that 100 PQs are available to represent the LQs, Quantum Circuit 310 may enable to represent qubits 4-6 of Circuit 301 using all of the available PQs, a majority thereof, or the like, while also enabling to represent qubits 0-3 of Circuit 302 using the majority of the available PQs.

Referring back to FIG. 2, after modifying a logical representation of a circuit, one or more border cycles may be identified with respect to a LQ. For example, for each LQ in a circuit, one or more border cycles may be identified. In some exemplary embodiments, a border cycle may separate between a first phase and a second phase of the LQ. In some exemplary embodiments, the first phase and the second phase may differ in the amount of usage of the LQ, in the manipulations of the LQ, a changing role of the LQ, or the like. For example, in case the LQ is utilized more times at the second phase compared to the first phase, a transfer operation may be enabled to be performed between the first phase and the second phase.

In some cases, the modification may be performed in order to enable to time the border cycles at globally optimized cycles with non-parallel gate operations. In some cases, the modification may be performed in order to transfer a first gate operation that is configured to manipulate a first LQ in a first cycle of the circuit, to manipulate the first LQ instead in a second cycle (which may or may not be adjacent to the first cycle) of the circuit. For example, this may be the case when the first gate operation is configured to be performed in parallel to a second gate operation of a second LQ, e.g., at the first cycle, which may be suboptimal for transfer operations. In order to enable a transfer operation between the first and second LQs, the first and second gate operations may be configured to be performed sequentially, e.g., by performing the second gate operation at the first cycle, and performing the first gate operation at the second cycle, or vice versa. In some cases, modifying the logical representation of the quantum circuit may comprise increasing a depth of the quantum circuit with respect to an original depth thereof, such as by adding cycles to the circuit. In some cases, performing the first gate operation at a non-parallel, sequential cycle with respect to the second gate operation may cause the circuit to have a greater depth than its original depth. For example, an original circuit may not comprise the second cycle, and the second cycle may be added by modifying the circuit.

On Step 230, the quantum circuit may be synthesized using a dynamic error correction scheme. In some exemplary embodiments, the dynamic error correction scheme may implement error correction operations for the circuit, using at least one transfer operation. For example, the dynamic error correction scheme may be configured to represent an LQ using a first number of PQs during a first phase, and using a second number of PQs during a second phase. In some exemplary embodiments, the dynamic error correction scheme may comprise a dynamic error scheme with respect to a single, individual, logical qubit. In some exemplary embodiments, the dynamic error correction scheme may comprise a dynamic error scheme with respect to a group of one or more logical qubits.

In some exemplary embodiments, the modified logical representations of the quantum circuit may correspond to a plurality of alternative physical representations of the quantum circuit, each of which implementing a modified logical representation with a different error correction scheme. For example, each alternative physical representation may comprise a different dynamic allocation of PQs to LQs at one or more cycles of the circuit. In some exemplary embodiments, each alternative physical representation may comprise a plurality of PQs (a greater number of PQs than LQs), which may be manipulated over a plurality of gates over a plurality of cycles.

In some exemplary embodiments, a search algorithm may be implemented, applied, or the like, on the plurality of alternative physical representations of the quantum circuit, such as in order to find an optimal physical representation. In some exemplary embodiments, the search algorithm may be configured to search in a solution space that comprises the alternative physical representations, each including different assignments of PQs to LQs at different cycles and implementing transfers of gates from one cycle to another (according to the modified logical representation). In some exemplary embodiments, the search algorithm may be configured to search in a solution space without changing a functionality of the quantum circuit.

In some exemplary embodiments, the search algorithm may be configured to search the plurality of alternative physical representations for detecting therein a dynamic assignment of the plurality of PQs to the plurality of LQs that has an optimal quality score. In some exemplary embodiments, the search algorithm may be configured to minimize a cost function associated with the circuit. In some exemplary embodiments, the cost function may be determined based on an error rate of the circuit, a cost associated with implementing transfers of gate operations, or the like. For example, the search algorithm may be configured to search for a physical representation that maximized the quality score while minimizing the cost function.

In some exemplary embodiments, the optimal dynamic error correction scheme may be defined in view of a quality score of alternative physical representations, e.g., as assigned by a quality measurer or the predictor disclosed herein. In some exemplary embodiments, the quality measurer that is used to compute the quality scores may be configured to use a quality metric that is monotonically correlated to error rates of the logical output qubits of the quantum circuit, when implementing each alternative physical representation. In some exemplary embodiments, the optimal error correction scheme may comprise a first assignment of first PQs to a LQ for a first set of cycles, and a second assignment of second PQs to the LQ for a second set of cycles. In some cases, the optimal dynamic error correction scheme may utilize a larger number of PQs than a number of represented LQs, at least in the first set of cycles, e.g., in order to enable an implementation of a surface code technique.

For example, according to the example of Step 220, in which a first gate operation manipulating a first LQ is moved from a first cycle to a second cycle, the error correction scheme may comprise a first assignment of first PQs to the first LQ for a first set of cycles, including the first cycle, and a second assignment of second PQs to the first LQ for a second set of cycles, including the second cycle. According to this example, since the first LQ is not manipulated by a gate during the first cycle, a number of the first PQs may be lesser than a number of the second PQs. For example, 50 PQ may be assigned to the first LQ during the first set of cycles, and 5,000 PQ during the second set of cycles.

Another technical problem dealt with by the disclosed subject matter may include determining an error correction scheme with an optimal quantity or number of PQs to use for representing a logical circuit. For example, it may be desired to select a quantity of PQs that minimize a cost of using PQs, minimizes a number of cycles, and minimize an error rate of the output. In some exemplary embodiments, a tradeoff may exist between a cost of the quantity of PQs that are used, and the resulting error rate of the circuit, e.g., since the more PQs are used, the more the error rate is reduced, while the cost of increasing the quantity PQs is increased. In some exemplary embodiments, it may be desired to select an error correction scheme that optimizes on user selected preferences.

One technical solution provided by the disclosed subject matter may comprise determining a quantity of PQs to use for an error correction scheme of a circuit, based on a determined marginal value of each added qubit, a determined marginal value of each error rate unit, or the like.

In some exemplary embodiments, a tradeoff between a cost of PQs and a resulting error rate may exist. As more PQs are used for an error correction scheme, the resulting error rate may be enhanced, but the cost may increase. In some exemplary embodiments, a cost function evaluating a cost of the PQs may increase for every added qubit that is used, and decrease for reduced quantities of PQs, e.g., linearly. In some cases, the cost function may assign a unified, linear cost for every added PQ. For example, using 2 PQs may cost twice as much than using one. In other cases, the cost function may not be linear. For example, each added qubit may cost more than the previous one, some qubits may cost more than others, or the like. In some exemplary embodiments, a cost of a PQ may relate to a time resource utilizes thereby, a computational resource utilized thereby, a communication resource utilized thereby, or the like.

In some exemplary embodiments, a quality measurer, such as the predictor disclosed herein, may utilize a quality metric to determine quality scores of circuits implementing different error correction schemes. The quality scores may result from implementing an error correcting scheme using the selected number of PQs, e.g., without necessarily executing the circuits. For example, the predictor may be trained on a dataset that comprises physical representations of circuits using different numbers of PQs, and respective quality scores thereof, thus enabling the predictor to predict a quality of a new sample without executing the circuit. In some exemplary embodiments, upon selecting a number of PQs, the PQs may be allocated to LQs as part of an error correction scheme of a circuit, such as according to the steps of FIG. 1, by an optimal dynamic allocation, e.g., as determined by the steps of FIG. 2, or the like. In some exemplary embodiments, a physical representation of a quantum circuit may be generated based on the selected number of PQs, such as by using only the indicated number of PQs in the circuit. In some exemplary embodiments, the physical representation of the circuit that is obtained in view of a number of selected PQs, may be sent to the quality measurer, such as for obtaining a quality score thereof. In some exemplary embodiments, the quality score may correspond to the quality scores described above, e.g., indicating an effect of the error rate of the output qubits of the circuit on its results. In some exemplary embodiments, the quality score may depend on the number of PQs that is used, e.g., increasing linearly with the number of PQs.

In some cases, it may be desired to obtain an optimal balance between a cost of PQs and a result thereof, e.g., according to a defined utility metric. For example, the utility metric may be user-defined. In some exemplary embodiments, a user may provide a utility function indicating a utility of different quality scores of circuits to the user. In some exemplary embodiments, the utility function of the user, also referred to as the Algorithm Value (AV) function, may provide a utility score, also referred to as an AV score.

For example, the utility function may comprise a linear function, an exponential function, or the like, according to a user preference. In some exemplary embodiments, the utility function may obtain, as an input, a circuit using a defined number of PQs, a quality score of the circuit, a number of cycles of the circuit, or the like. In some exemplary embodiments, the utility of the circuit to the user may be determined based on the quality score of the circuit, based on a number of cycles required for implementing the circuit using the chosen number of PQs, or based on any other criteria, user preference, user constraints, user objectives, or the like. For example, a user may assign a cost for each additional cycle, and the cost may be subtracted from the quality score to determine the utility of the circuit to the user. In addition, the cost of the qubits may be subtracted from the quality score, since the user may desire to reduce a cost of the qubits. In some exemplary embodiments, each selection of a number of PQs may result with a different physical representation of the circuit, which may have a different cycle-wise length. In some exemplary embodiments, a tradeoff may exist between a number of cycles, executions, or the like, to a number of physical qubits assigned to a circuit. For example, as fewer physical qubits are assigned to the circuit, more cycles may be needed, and vice versa.

In some exemplary embodiments, for a given selection of N PQs, a utility of the assignment of N PQs for the user, in view of the resulting quality value, the cycle cost, and the qubit cost, may in some cases be determined as follows:

$$AV(AQ(N))-C(N) \tag{1}$$

where AV denotes a utility function that determines the utility of a quality score to the user in view of the number of cycles, AQ denoted a function that determined the quality score of the circuit when using N PQs (e.g., determined by the predictor), and the function C denoted a cost function indicating a cost of selecting the N PQs.

In some exemplary embodiments, it may be desired to obtain a selection of N PQs, that maximized the utility of the circuit for the user, in view of the resulting cost, e.g., as follows:

$$F(N)=AV(N)-C(N) \tag{2}$$

where F denotes a utility function of the circuit when the cost is subtracted therefrom, AV denotes the utility of the circuit for the user regardless of the cost, and the function C denoted a cost function indicating a cost of selecting the N PQs.

In some exemplary embodiments, F(N) may comprise an objective function that may be configured to be maximized. In some exemplary embodiments, an optimal assignment of N may comprise an assignment that maximizes the function F(N). In some exemplary embodiments, in order to detect an assignment of N that maximizes the function F(N), a marginal value of PQ units, including individual qubits or groups thereof, may be calculated and used. In some exemplary embodiments, the marginal value may indicate an incremental change of the utility score based on the per-unit shift of qubits, thus providing a value-per-qubit metric. In some exemplary embodiments, the value-per-qubit may indicate a value or utility of utilizing and executing a qubit per second, or per any other time unit. In some exemplary embodiments, one or more search algorithm may be implemented to search for an assignment of PQs that results with the highest value-per-qubit score.

In some cases, it may be desired to select a quantity of PQs that provide the highest marginal value. For example, in order to obtain a certain error rate, a first circuit may be required to be executed 10,000 times, while a second circuit may be required to be executed 2,000 times in order to obtain the same error rate, quality score, or the like. In some exemplary embodiments, according to this example, the second circuit may be executed a fifth of number of executions of the first circuit to obtain the same error rate. In some exemplary embodiments, in case the quantity of PQs that are used by the second circuit comprise less than a fifth of the quantity of PQs used for the first circuit, a value-per-qubit of the second circuit may be higher. Otherwise, in case the quantity of PQs that are used by the second circuit comprise more than a fifth of the quantity of PQs used for the first circuit, a value-per-qubit of the first circuit may be higher.

As an example, a selected quantity of PQs may be obtained, and a circuit may be modified to utilize only the selected quantity of PQs, e.g., using a static or dynamic allocation of PQs to LQs. In some exemplary embodiments, an indication of the circuit may be sent to the predictor, to determine a quality score thereof, and a utility function may determine the utility of the circuit to the user, in view of the quality score and number of cycles thereof. In some exemplary embodiments, an indication of the circuit, the quantity of PQs used thereby, or the like, may be sent to a cost function, which may determine a cost of the PQs, a computational cost of the circuit, a time cost of the circuit, or the like. In some exemplary embodiments, a difference between the utility score and the cost may be used as an evaluation of the value-per-qubit of the implemented circuit.

In some cases, a quantity of PQs that provide the highest marginal value may not necessarily be optimal for a user. For example, a value-per-qubit of a first circuit may be higher than a value-per-qubit of a second circuit, but a quality score of the second circuit may be better than the first. In some cases, a value-per-qubit of the first circuit may be higher than the value-per-qubit of a second circuit, but a quality score of the first circuit may be lesser than a minimal quality required by the user. In some cases, the user may prefer a physical representation of a circuit that does not optimize on the value-per-qubit metric, such as in case the user prioritizes a quality score, in case the user prioritizes a compliance with one or more constraints, objectives, or the like.

In some exemplary embodiments, in case the user is not attempting to merely optimize on the value-per-qubit metric, the user may provide a value-per-quality input, indicating a utility of every unit of quality to the user, a constraint on a minimal quality that must be reached, or the like. In some exemplary embodiments, an optimal quantity of PQs may be selected to optimize on the value-per-quality input, such as by using one or more resource allocation techniques, implementing cloud computing that supports resource allocation techniques, optimizers, or the like.

In some exemplary embodiments, a user may input, or define, a value-per-quality. For example, a minimal quality score may be required by the user, e.g., as a constraint, and above the minimal quality score, every enhancement in the quality may be valued according to a defined user rate, utility function, or the like. In some exemplary embodiments, a payment for the value-per-quality may be oppositely correlated to the error rate, as a higher error rate may be associated to a lower utility, and therefore a lower pay. In some cases, a target error rate for a circuit may be selected according to a desired cost. For example, in case a user wishes to reach a target cost, a physical representation of the circuit that obtains a maximal value-per-quality may be selected.

One technical effect obtained by the disclosed subject matter is enabling to select an optimal number of PQs according to objectives, such as a desired cost-per-qubit, a desired cost-per-quality, or the like, and in view of one or more constraints, such as a target cost, a minimal quality, or the like.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 4:
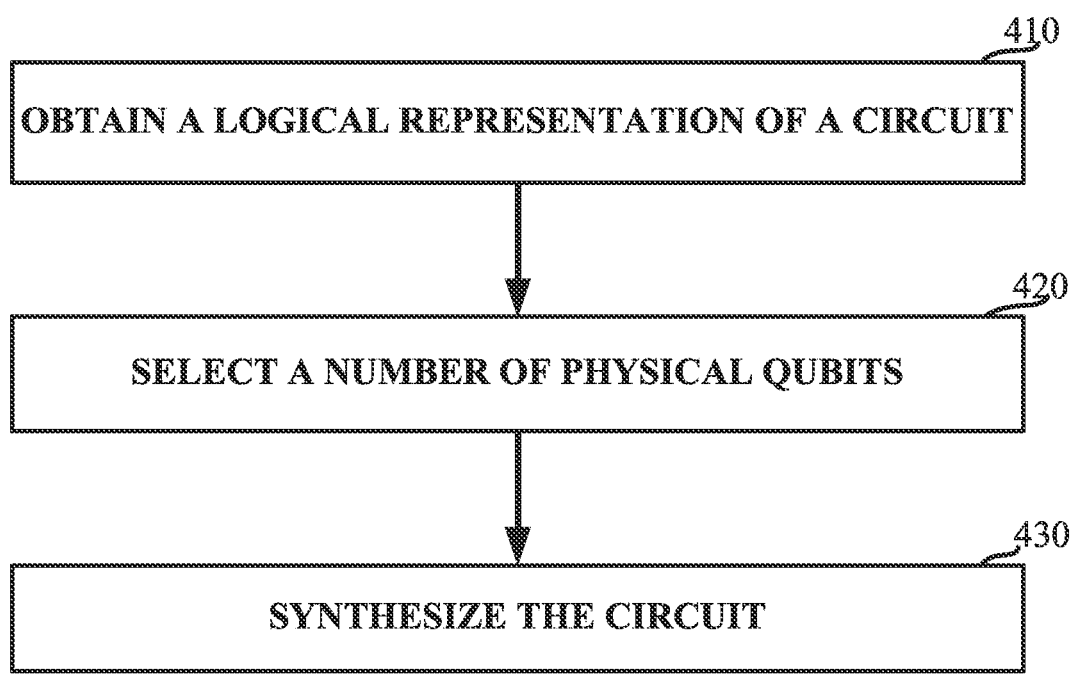
FIG. 4 shows an exemplary flowchart diagram of a method, in accordance with some exemplary embodiments of the disclosed subject matter.

Referring now to FIG. 4, showing an exemplary flowchart diagram of a method, in accordance with some exemplary embodiments of the disclosed subject matter.

On Step 410, a logical representation of a quantum circuit may be obtained. In some exemplary embodiments, the logical representation may comprise a plurality of LQs, subsets thereof, or the like, which may be manipulated by gate operations in a plurality of cycles. In some exemplary embodiments, the LQs may comprise one or more output qubits, through which the logical representation of the quantum circuit may be configured to provide an output.

On Step 420, a number of PQs for an error correction scheme may be selected for a physical representation of the quantum circuit. In some exemplary embodiments, the selection may be based on a utility per-qubit metric that is used to define a utility per-qubit score of the quantum circuit. In some exemplary embodiments, the utility per-qubit score may indicate a utility of each qubit in the physical representation. In some exemplary embodiments, the utility per-qubit score may be determined based on a ratio between a quality score of the quantum circuit when using the selected quantity of physical qubits and between a cost function of the quantum circuit.

In some exemplary embodiments, the cost function may be determined based on the quantity of physical qubits, a quantity of cycles used by the physical representation, or the like. In some exemplary embodiments, the quality score may be defined by a quality metric that is monotonically correlated to error rates of the one or more logical output qubits.

In some exemplary embodiments, the quantity of PQs may be selected by determining that the quantity optimizes a value of the utility per-qubit metric. In some exemplary embodiments, selecting the quantity of PQS may comprise determining that the quantity of physical qubits optimizes the utility per-qubit score while complying with a constraint on the quality score.

In some exemplary embodiments, the logical representation of the quantum circuit may be implementable using a plurality of alternative physical representations of the quantum circuit, each of which comprising a different selected quantity of physical qubits. In some exemplary embodiments, a search algorithm may be implemented or applied on the plurality of alternative physical representations, such as in order to detect an optimal physical representation that provides a best value of the utility per-qubit metric. For example, a best value may include a highest value, a highest value under one or more constraints, or the like. In some exemplary embodiments, the search algorithm may be configured to search for an optimal utility per-qubit score in a solution space that comprises the plurality of alternative physical representations. In some exemplary embodiments, the quality metric that is used to determine the utility per-qubit score may be monotonically correlated to error rates of the one or more logical output qubits of the quantum circuit when implementing each alternative physical representation.

In some exemplary embodiments, in some cases, the number of PQs for an error correction scheme may be selected based on a marginal value of an error unit of an estimated error rate. For example, the estimated error rate may comprise an error rate that synthesizing the circuit according to the number of physical qubits is expected to produce.

In some exemplary embodiments, in order to reduce a number of physical qubits to be used, a depth of the quantum circuit may be determined to be increased, e.g., as follows:

$$N_{orig} \cdot Q_{orig} \cdot C > N_{new} \cdot Q_{new} \cdot C \qquad (3)$$

wherein $N_{orig}$ is a number of cycles in the quantum circuit, $Q_{orig}$ is a number of physical qubits to be used in a physical representation of the quantum circuit, $N_{new}$ is a number of cycles in a modified quantum circuit having the increased depth, and $Q_{new}$ is a number of physical qubits to be used in a physical representation of the modified quantum circuit having the increased depth.

On Step 430, the quantum circuit may be synthesized using the error correction scheme. In some exemplary embodiments, the error correction scheme may implement error correction operations for the circuit, using the selected quantity of PQs.

Figure 5:
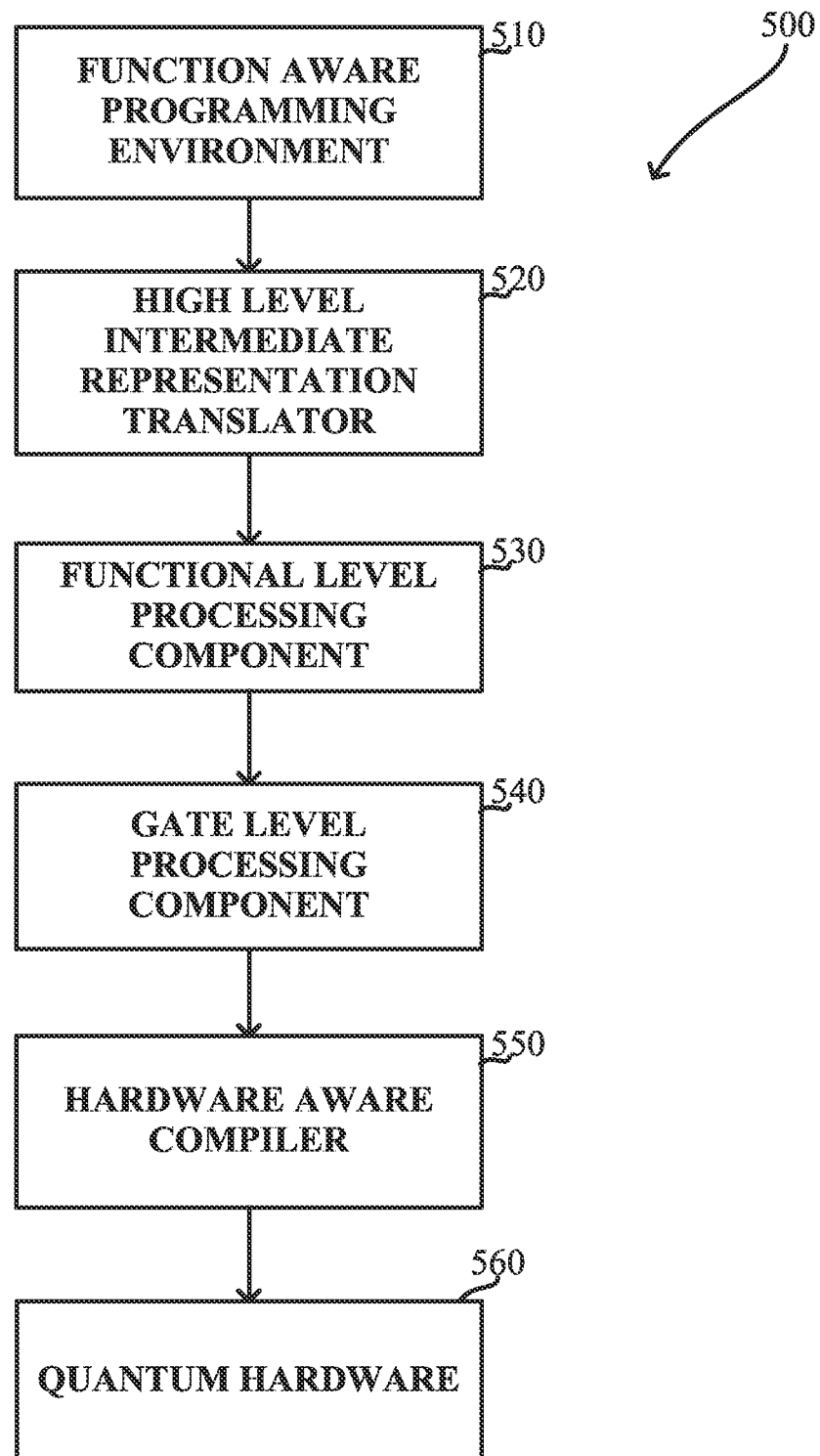
FIG. 5 shows an exemplary environment, in accordance with some exemplary embodiments of the disclosed subject matter.

Referring now to FIG. 5, showing an exemplary environment, in accordance with some exemplary embodiments of the disclosed subject matter.

In some exemplary embodiments, Environment 500 may correspond to the environment disclosed in U.S. application Ser. No. 17/450,583, titled "Functional-Level Processing Component for Quantum Computers", filed Oct. 12, 2021, which is hereby incorporated by reference in its entirety for all purposes without giving rise to disavowment.

In some exemplary embodiments, Environment 500 may comprise a Functional Aware Programming Environment 510. In some exemplary embodiments, Functional Aware Programming Environment 510 may comprise a programming environment that supports one or more high level programming languages for programming a quantum program, in an abstract form that does not necessarily refer to a qubit set, a gate set, or the like. Functional Aware Programming Environment 510 may utilize libraries with functions, variable types, or the like, e.g., QCL™ libraries.

In some exemplary embodiments, using Functional Aware Programming Environment 510, a programmer may program a high-level quantum program. In some exemplary embodiments, the quantum program may specify high level functions, low level components such as gates, or the like. In some exemplary embodiments, the high-level quantum program may not indicate directly a number of qubits and cycles that will be used for implementing the program. For example, in order to implement the program, qubits may be allocated for error correction schemes, to comply with hardware constraints, or the like, as a backend functionality, without necessarily notifying the programmer.

In some exemplary embodiments, Environment 500 may comprise a High Level Intermediate Representation (IR) Translator 520, which may comprise a front-end processing component. In some exemplary embodiments, a quantum program created at Functional Aware Programming Environment 510 may be provided to High Level IR Translator 520, for further processing. In some exemplary embodiments, High Level IR Translator 520 may be configured to translate the quantum program to a high-level IR representation, including a language-independent intermediate representation of the program's code. In some exemplary embodiments, High Level IR Translator 520 may translate the quantum program from any programming language to a high-level intermediate representation. In some exemplary embodiments, the high-level IR may represent the functions in the high-level programming language. In some exemplary embodiments, High Level IR Translator 520 may be hardware agnostic, as it may not specify a quantum instruction or gate set.

In some exemplary embodiments, Environment 500 may comprise a Functional Level Processing Component 530, which may be hardware-aware and functional-aware. In some exemplary embodiments, Functional Level Processing Component 530 may obtain the IR functional-level representation of the quantum program from High Level IR Translator 520, in addition to one or more hardware constraints, user preferences, or the like. In some exemplary embodiments, Functional Level Processing Component 530 may operate software tools on the program, while taking into account hardware information and optimization information. In some exemplary embodiments, Functional Level Processing Component 530 may be configured to determine a gate-level implementation for the high-level program based on optimizations that are determined using a functional understating of the written functions, hardware data, user constraints, or the like.

In some exemplary embodiments, Environment 500 may comprise a Gate Level Processing Component 540. In some exemplary embodiments, Gate Level Processing Component 540 may obtain from Functional Level Processing Component 530 a gate-level representation of the quantum program, and potentially one or more additional schedules, allocations, instructions, metadata, or the like. In some exemplary embodiments, Gate Level Processing Component 540 may create a logical program by scheduling each gate or functional block within the logical program, allocating qubits and cycles for each gate, connecting qubits from some functional blocks to other functional blocks, or the like.

In some exemplary embodiments, Environment 500 may comprise a Hardware Aware Compiler 550 and a Quantum Hardware 560. In some exemplary embodiments, Hardware Aware Compiler 550 may obtain the logical program from Gate Level Processing Component 540, or a low-level IR thereof, and compile the program into a machine representation. In some exemplary embodiments, Hardware Aware Compiler 550 may be specifically tailored to match Quantum Hardware 560, e.g., to implement the program using available hardware gates, qubits, or the like, based on hardware constraints of Quantum Hardware 560. In some exemplary embodiments, Hardware Aware Compiler 550 may allocate hardware qubits to physical representations of qubits, hardware gates to physical representations of gates, or the like. In some exemplary embodiments, the resulting quantum circuit may be executed on the Quantum Hardware 560 or in a simulator thereof. In some exemplary embodiments, a quality of the resulting executable quantum circuit may be evaluated using one or more evaluation tools, which may be associated to the specific properties of Quantum Hardware 560.

In some exemplary embodiments, an error correcting mechanism may be implemented by Functional Level Processing Component 530, Gate Level Processing Component 540, Hardware Aware Compiler 550, or the like. For example, the error correcting mechanism may comprise an allocation of PQs to represent LQs. In some cases, the methods of FIGS. 1-2 and 4, alone or in combination, may be used by Gate Level Processing Component 540, Functional Level Processing Component 530, or the like, in order to determine a dynamic or static allocation of PQs to LQs, to select a quantity of PQs to be used by the error correcting mechanism, or the like.

Figure 6:
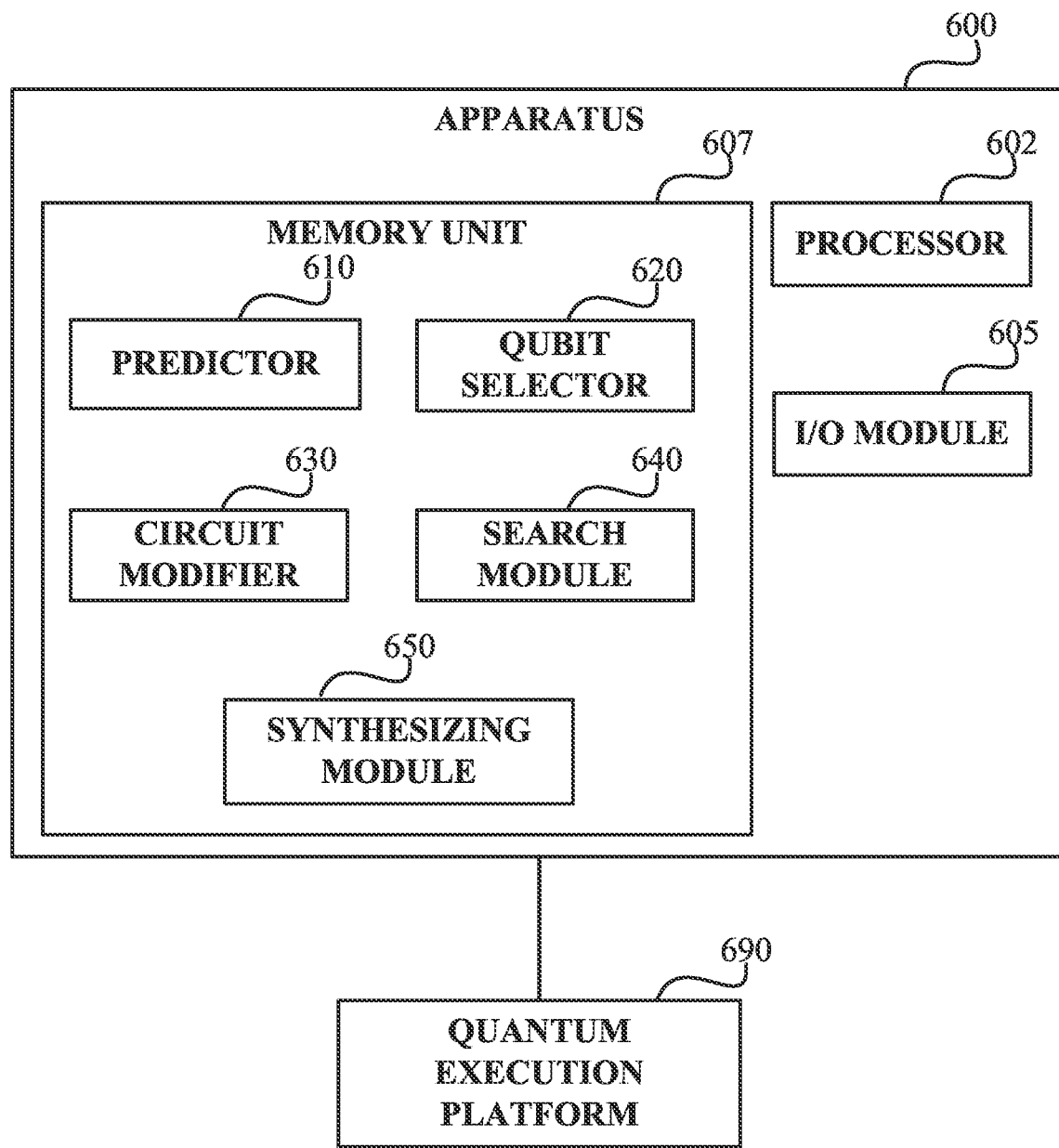
FIG. 6 shows an exemplary block diagram of an apparatus, in accordance with some exemplary embodiments of the disclosed subject matter.

Referring now to FIG. 6 showing a block diagram of an apparatus, in accordance with some exemplary embodiments of the disclosed subject matter.

In some exemplary embodiments, Apparatus 600 may comprise one or more Processor(s) 602. Processor 602 may be a Central Processing Unit (CPU), a microprocessor, an electronic circuit, an Integrated Circuit (IC) or the like. Processor 602 may be utilized to perform computations required by Apparatus 600 or any of its subcomponents. It is noted that Processor 602 may be a traditional classical processor, and not necessarily a quantum processor.

In some exemplary embodiments of the disclosed subject matter, Apparatus 600 may comprise an Input/Output (I/O) module 605. I/O Module 605 may be utilized to provide an output to and receive input from a user, an apparatus, or the like, such as, for example to obtain a user-defined quantum program, showing circuit illustrations, communicating with quantum hardware, obtaining a quality measurer, or the like.

In some exemplary embodiments, Apparatus 600 may comprise Memory 607. Memory 607 may be a hard disk drive, a Flash disk, a Random Access Memory (RAM), a memory chip, or the like. In some exemplary embodiments, Memory 607 may retain program code operative to cause Processor 602 to perform acts associated with any of the subcomponents of Apparatus 600. Memory 607 may comprise one or more components as detailed below, implemented as executables, libraries, static libraries, functions, or any other executable components.

In some exemplary embodiments, Memory 607 may comprise a Predictor 610, also referred to as the 'quality measurer'. Predictor 610 may be configured to estimate a quality score of one or more circuits, such as by determining an effect of error rates of LQs of the circuit on the output. For example, Predictor 610 may determine an estimated ratio between results obtained by a theoretical non-error circuit, and results obtained by executing the circuit on a quantum computer (e.g., by simulating the executions, based on a dataset, or the like).

In some exemplary embodiments, Memory 607 may comprise a Qubit Selector 620, which may be configured to select a number of qubits to be used for an error correction scheme of a circuit. In some exemplary embodiments, Qubit Selector 620 may be configured to select a number of qubits based on a cost function of the qubits, and based on a quality score of the circuit that implements the selected number of qubits, e.g., as obtained from Predictor 610.

In some exemplary embodiments, Memory 607 may comprise a Circuit Modifier 630, which may be configured to modify a circuit, such as in case a dynamic allocation of PQs to LQs is attempted to be found. In some exemplary embodiments, Circuit Modifier 630 may be configured to modify the circuit by detecting two or more aligned gates that are configured to be implemented simultaneously, in overlapping cycles, or the like, and move one of the gates to a different cycle, such as in order to enable sequential execution using transfer operations. In some exemplary embodiments, Circuit Modifier 630 may be configured to provide one or more modified circuits to Search Module 640, such as in order to search through a search space defined by the modified circuits.

In some exemplary embodiments, Memory 607 may comprise a Search Module 640. In some exemplary embodiments, Search Module 640 may be configured to apply one or more search algorithms on a search space defined by one or more alternative physical representations of a circuit, properties of the circuit, constraints of the circuit, or the like. For example, the search space may define whether static allocations of PQs are enabled, whether dynamic allocations of PQs are enabled, whether circuit modifications are enabled, or the like. In some exemplary embodiments, Search Module 640 may go over the search space using the search algorithms, and evaluate a quality score of inspected circuits using Predictor 610, such as in order to obtain an optimal error correction scheme for the circuit.

In some exemplary embodiments, Synthesizing Module 650 may be configured to synthesize quantum circuits according an optimal error correction scheme determined by Search Module 650. In some exemplary embodiments, Synthesizing Module 650 may be configured to execute quantum circuits onto Quantum Execution Platform 690, or any other execution platform, to be executed thereby. In some exemplary embodiments, Synthesizing Module 650 may simulate execution of the quantum circuit using an emulator, a simulator, or the like, on a classic computer, instead of actual execution by Quantum Execution Platform 690.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:
    obtaining a logical representation of a quantum circuit, wherein the logical representation comprises a plurality of logical qubits, wherein the logical representation defines gate operations on subsets of the plurality of logical qubits in a plurality of cycles, wherein the plurality of logical qubits comprises one or more logical output qubits, wherein the logical representation of the quantum circuit is configured to provide an output via the one or more logical output qubits, wherein the logical representation of the quantum circuit is implementable by a plurality of alternative physical representations of the quantum circuit, each of which implementing the logical representation with a different error correction scheme, wherein each alternative physical representation of the plurality of alternative physical representations comprises a plurality of physical qubits, wherein a number of the plurality of physical qubits is greater than a number of the plurality of logical qubits;

defining error correction schemes for the quantum circuit, wherein an error correction scheme of the error correction schemes is configured to implement error correction operations to a group of one or more logical qubits using multiple physical qubits, wherein a number of the multiple physical qubits is greater than a number of the group of the one or more logical qubits, wherein said defining the error correction schemes comprises:

implementing a search algorithm on the plurality of alternative physical representations of the quantum circuit, wherein the search algorithm is configured to search the plurality of alternative physical representations for a physical representation of the quantum circuit with an assignment of the plurality of physical qubits to the plurality of logical qubits, wherein the assignment is defined in view of a quality score of each alternative physical representation, wherein a quality metric used to compute the quality score is monotonically correlated to error rates of the one or more logical output qubits of the quantum circuit when implementing each alternative physical representation, wherein the quality score is determined based on a ratio between:

a number of executions of a theoretical representation of the quantum circuit that are needed to obtain a predetermined number of correct outputs, and a number of executions of the quantum circuit that implements the error correction schemes on a quantum computer, which are needed to obtain the predetermined number of the correct outputs; and utilizing the assignment of the plurality of physical qubits to the plurality of logical qubits to define the error correction schemes for the quantum circuit; and synthesizing the quantum circuit using the error correction schemes, whereby a synthesized quantum circuit utilizes the multiple physical qubits that are assigned to the groups of the one or more of logical qubits to represent the group of the one or more logical qubits in a manner reducing an error rate of the plurality of logical qubits.

2. The method of claim 1 further comprising obtaining a quality measurer, wherein the quality measurer is configured to compute quality scores of quantum circuits with defined error correction schemes, wherein said implementing the search algorithm comprises applying the quality measurer.

3. The method of claim 2, wherein said obtaining the quality measurer comprises generating the quality measurer.

4. The method of claim 3, wherein said generating the quality measurer comprises:

obtaining a set of assignments of physical qubits to logical qubits and computed quality scores relating thereto; and generating the quality measurer based on interpolation of the set of assignments and computed quality scores relating thereto.

5. The method of claim 1, wherein the quality score is further based on a distance metric between:

a distribution provided by a theoretical representation of the quantum circuit, and a distribution provided by executing, on a quantum computer, the quantum circuit that implements the error correction schemes.

6. The method of claim 1, wherein the assignment is an assignment in which at least two logical qubits of the plurality of logical qubits have different error rates.

7. The method of claim 1, wherein said defining the error correction schemes for the quantum circuit comprises:

defining for a first logical qubit of the plurality of logical qubits a first error correction scheme that utilizes a first set of physical qubits of the plurality of physical qubits, wherein a number of physical qubits in the first set of physical qubits is greater than one; and defining for a second set of logical qubits of the plurality of logical qubits a second error correction scheme that utilizes a second set of physical qubits of the plurality of physical qubits, wherein a number of qubits in the second set of physical qubits is greater than a number of qubits in the second set of logical qubits, wherein the first set of physical qubits and the second set of physical qubits are disjoint sets, wherein the first logical qubit and the second set of logical qubits are disjoint.

8. The method of claim 1, wherein the error correction schemes utilize a surface code technique for representing the group of one or more logical qubits using the multiple physical qubits.

9. The method of claim 1, wherein the search algorithm comprises at least one of:

a gradient descent algorithm, and a hill climbing algorithm.

10. The method of claim 1, wherein the search algorithm comprises at least one of:

a local search optimizer, and a global search optimizer.

11. An apparatus comprising a processor and coupled memory, said processor being adapted to:

obtain a logical representation of a quantum circuit, wherein the logical representation comprises a plurality of logical qubits, wherein the logical representation defines gate operations on subsets of the plurality of logical qubits in a plurality of cycles, wherein the plurality of logical qubits comprises one or more logical output qubits, wherein the logical representation of the quantum circuit is configured to provide an output via the one or more logical output qubits, wherein the logical representation of the quantum circuit is implementable by a plurality of alternative physical representations of the quantum circuit, each of which implementing the logical representation with a different error correction scheme, wherein each alternative physical representation of the plurality of alternative physical representations comprises a plurality of physical qubits, wherein a number of the plurality of physical qubits is greater than a number of the plurality of logical qubits;

define error correction schemes for the quantum circuit, wherein an error correction scheme of the error correction schemes is configured to implement error correction operations to a group of one or more logical qubits using multiple physical qubits, wherein a number of the multiple physical qubits is greater than a number of the group of the one or more logical qubits, wherein said defining the error correction schemes comprises:

implementing a search algorithm on the plurality of alternative physical representations of the quantum circuit, wherein the search algorithm is configured to search the plurality of alternative physical representations for a physical representation of the quantum circuit with an assignment of the plurality of physical qubits to the plurality of logical qubits, wherein the assignment is defined in view of a quality score of each alternative physical representation, wherein a quality metric used to compute the quality score is monotonically correlated to error rates of the one or more logical output qubits of the quantum circuit when implementing each alternative physical representation, wherein the quality score is determined based on a ratio between:
  a number of executions of a theoretical representation of the quantum circuit that are needed to obtain a predetermined number of correct outputs, and
  a number of executions of the quantum circuit that implements the error correction schemes on a quantum computer, which are needed to obtain the predetermined number of the correct outputs; and
  utilizing the assignment of the plurality of physical qubits to the plurality of logical qubits to define the error correction schemes for the quantum circuit; and
synthesize the quantum circuit using the error correction schemes, whereby a synthesized quantum circuit utilizes the multiple physical qubits that are assigned to the groups of the one or more of logical qubits to represent the group of the one or more logical qubits in a manner reducing an error rate of the plurality of logical qubits.

12. The apparatus of claim 11, wherein the processor is further adapted to obtain a quality measurer, wherein the quality measurer is configured to compute quality scores of quantum circuits with defined error correction schemes, wherein said implementing the search algorithm comprises applying the quality measurer.

13. The apparatus of claim 12, wherein said obtaining the quality measurer comprises generating the quality measurer, wherein said generating the quality measurer comprises:
  obtaining a set of assignments of physical qubits to logical qubits and computed quality scores relating thereto; and
  generating the quality measurer based on interpolation of the set of assignments and computed quality scores relating thereto.

14. The apparatus of claim 11, wherein the quality score is further based on a distance metric between:
  a distribution provided by a theoretical representation of the quantum circuit, and
  a distribution provided by executing, on a quantum computer, the quantum circuit that implements the error correction schemes.

15. The apparatus of claim 11, wherein the assignment is an assignment in which at least two logical qubits of the plurality of logical qubits have different error rates.

16. The apparatus of claim 11, wherein said defining the error correction schemes for the quantum circuit comprises:
  defining for a first logical qubit of the plurality of logical qubits a first error correction scheme that utilizes a first set of physical qubits of the plurality of physical qubits, wherein a number of physical qubits in the first set of physical qubits is greater than one; and
  defining for a second set of logical qubits of the plurality of logical qubits a second error correction scheme that utilizes a second set of physical qubits of the plurality of physical qubits, wherein a number of qubits in the second set of physical qubits is greater than a number of qubits in the second set of logical qubits,
  wherein the first set of physical qubits and the second set of physical qubits are disjoint sets, wherein the first logical qubit and the second set of logical qubits are disjoint.

17. The apparatus of claim 11, wherein the error correction schemes utilize a surface code technique for representing the group of one or more logical qubits using the multiple physical qubits.

18. A computer program product comprising a non-transitory computer readable medium retaining program instructions, which program instructions, when read by a processor, cause the processor to:
  obtain a logical representation of a quantum circuit, wherein the logical representation comprises a plurality of logical qubits, wherein the logical representation defines gate operations on subsets of the plurality of logical qubits in a plurality of cycles, wherein the plurality of logical qubits comprises one or more logical output qubits, wherein the logical representation of the quantum circuit is configured to provide an output via the one or more logical output qubits, wherein the logical representation of the quantum circuit is implementable by a plurality of alternative physical representations of the quantum circuit, each of which implementing the logical representation with a different error correction scheme, wherein each alternative physical representation of the plurality of alternative physical representations comprises a plurality of physical qubits, wherein a number of the plurality of physical qubits is greater than a number of the plurality of logical qubits;
  define error correction schemes for the quantum circuit, wherein an error correction scheme of the error correction schemes is configured to implement error correction operations to a group of one or more logical qubits using multiple physical qubits, wherein a number of the multiple physical qubits is greater than a number of the group of the one or more logical qubits, wherein said defining the error correction schemes comprises:
    implementing a search algorithm on the plurality of alternative physical representations of the quantum circuit, wherein the search algorithm is configured to search the plurality of alternative physical representations for a physical representation of the quantum circuit with an assignment of the plurality of physical qubits to the plurality of logical qubits, wherein the assignment is defined in view of a quality score of each alternative physical representation, wherein a quality metric used to compute the quality score is monotonically correlated to error rates of the one or more logical output qubits of the quantum circuit when implementing each alternative physical representation; and
    utilizing the assignment of the plurality of physical qubits to the plurality of logical qubits to define the error correction schemes for the quantum circuit, wherein the quality score is determined based on a ratio between:
      a number of executions of a theoretical representation of the quantum circuit that are needed to obtain a predetermined number of correct outputs, and
      a number of executions of the quantum circuit that implements the error correction schemes on a quantum computer, which are needed to obtain the predetermined number of the correct outputs; and synthesize the quantum circuit using the error correction schemes, whereby a synthesized quantum circuit utilizes the multiple physical qubits that are assigned to the groups of the one or more of logical qubits to represent the group of the one or more logical qubits in a manner reducing an error rate of the plurality of logical qubits.

* * * * *